United States Patent
Gadre

(10) Patent No.: US 12,189,375 B2
(45) Date of Patent: Jan. 7, 2025

(54) DYNAMIC SCHEDULING BASED ON TASK DEPENDENCIES

(71) Applicant: Applied Materials, Inc., Santa Clara, CA (US)

(72) Inventor: Milind Jayram Gadre, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 639 days.

(21) Appl. No.: 17/477,023

(22) Filed: Sep. 16, 2021

(65) Prior Publication Data

US 2022/0091883 A1    Mar. 24, 2022

Related U.S. Application Data

(60) Provisional application No. 63/081,151, filed on Sep. 21, 2020.

(51) Int. Cl.
*G05B 19/418* (2006.01)
*G06F 16/901* (2019.01)
*G06N 20/00* (2019.01)

(52) U.S. Cl.
CPC ... *G05B 19/41865* (2013.01); *G06F 16/9024* (2019.01); *G06N 20/00* (2019.01)

(58) Field of Classification Search
CPC .......... G05B 19/41865; G06F 16/9024; G06N 20/00
See application file for complete search history.

(56) References Cited

U.S. PATENT DOCUMENTS

| 9,477,799 | B2 | 10/2016 | Yachide et al. |
| 2002/0006677 | A1 | 1/2002 | Egermeier et al. |
| 2005/0278049 | A1* | 12/2005 | Van Den Nieuwelaar ............... G05B 19/41865 700/100 |
| 2008/0262992 | A1 | 10/2008 | Meijer et al. |
| 2022/0171373 | A1* | 6/2022 | Chau .................. C23C 14/54 |

FOREIGN PATENT DOCUMENTS

| JP | 2016538643 A | 12/2016 |
| WO | 2020128655 A1 | 6/2020 |

OTHER PUBLICATIONS

International Search Report and Written Opinion dated Jan. 10, 2022 for PCT Application No. PCT/US2021/050977.

\* cited by examiner

*Primary Examiner* — Michael W Choi
(74) *Attorney, Agent, or Firm* — Lowenstein Sandler LLP

(57) ABSTRACT

A method includes determining a plurality of dependencies associated with a plurality of tasks of a substrate processing system. The method further includes generating, based on the plurality of dependencies, a dependency graph of the plurality of tasks. The method further includes topologically sorting the dependency graph to generate one or more outputs. A schedule associated with processing a plurality of substrates in the substrate processing system is based on the one or more outputs.

20 Claims, 9 Drawing Sheets

DYNAMIC SCHEDULING BASED ON TASK DEPENDENCIES

RELATED APPLICATIONS

This application claims the benefit of U.S. Provisional Application No. 63/081,151, filed Sep. 21, 2020, the contents of which are hereby incorporated by reference in their entirety.

TECHNICAL FIELD

The present disclosure relates to scheduling, and, more particularly, scheduling based on task dependencies.

BACKGROUND

Manufacturing systems, such as substrate processing systems, are assembled, tested, and used for producing products. The assembly, testing, and use of manufacturing systems have delays.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes determining a plurality of dependencies associated with a plurality of tasks of a substrate processing system. The method further includes generating, based on the plurality of dependencies, a dependency graph of the plurality of tasks. The method further includes topologically sorting the dependency graph to generate one or more outputs. A schedule associated with processing a plurality of substrates in the substrate processing system is based on the one or more outputs.

In another aspect of the disclosure, a non-transitory machine-readable storage medium storing instructions which, when executed cause a processing device to perform operations including determining a plurality of dependencies associated with a plurality of tasks of a substrate processing system. The operations further include generating, based on the plurality of dependencies, a dependency graph of the plurality of tasks. The operations further include topologically sorting the dependency graph to generate one or more outputs. A schedule associated with processing a plurality of substrates in the substrate processing system is based on the one or more outputs.

In another aspect of the disclosure, a system includes a memory and a processing device coupled to the memory. The processing device is to determine a plurality of dependencies associated with a plurality of tasks of a substrate processing system. The processing device is further to generate, based on the plurality of dependencies, a dependency graph of the plurality of tasks. The processing device is further to topologically sort the dependency graph to generate one or more outputs. A schedule associated with processing a plurality of substrates in the substrate processing system is based on the one or more outputs.

BRIEF DESCRIPTION OF THE DRAWINGS

The present disclosure is illustrated by way of example, and not by way of limitation in the figures of the accompanying drawings.

DETAILED DESCRIPTION

Figure 1A:
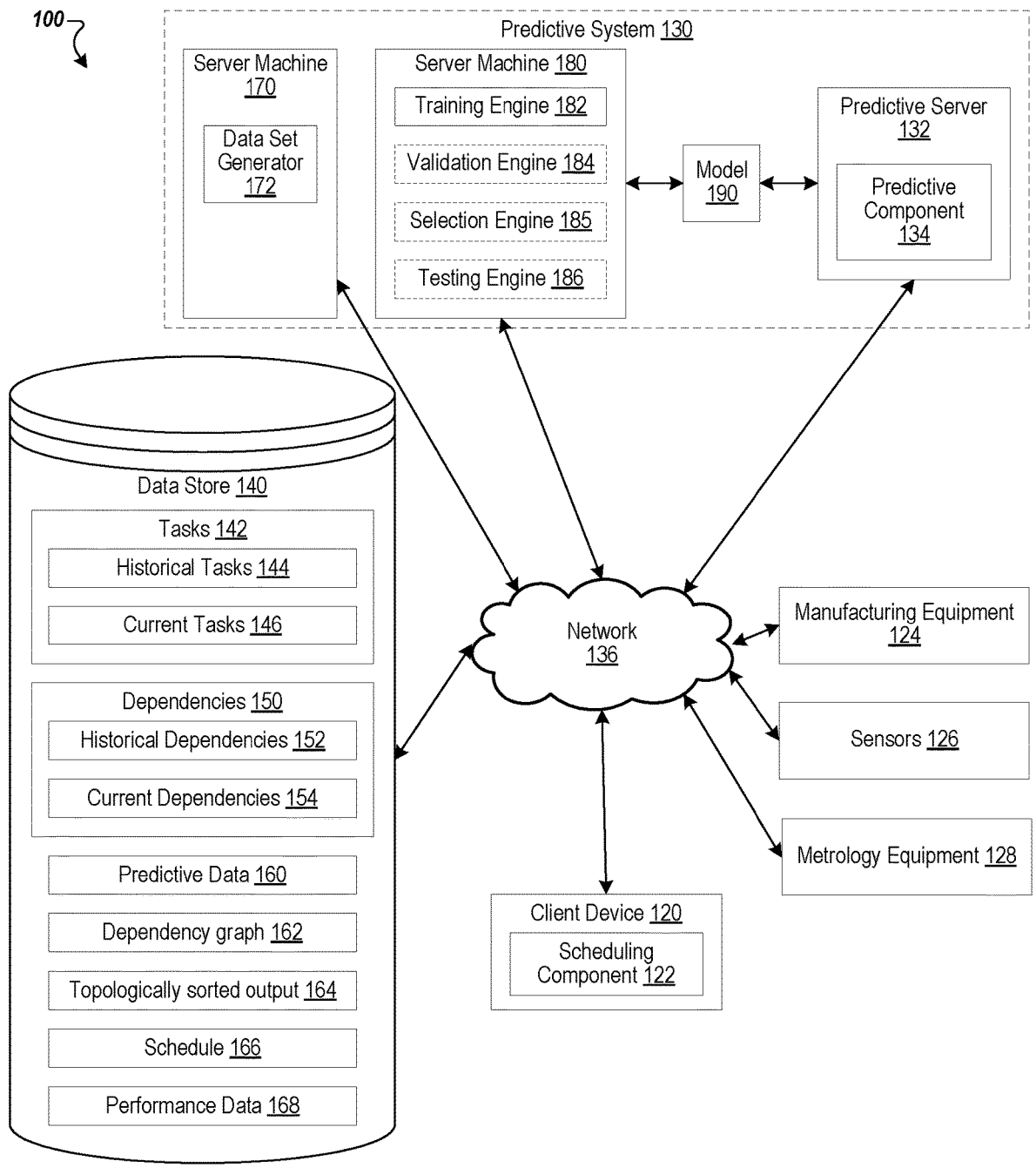
FIG. 1A is a block diagram illustrating an exemplary system architecture, according to certain embodiments.

Described herein are technologies directed to dynamic scheduling based on task dependencies (e.g., tool startup time operation).

Manufacturing systems, such as substrate processing systems, are assembled, tested, inspected, and used for producing products. A substrate processing system undergoes tasks, such as assembly tasks, testing tasks, transferring tasks, processing tasks, and/or the like, during tool start-up (e.g., commissioning, installation, replacement of one or more components, etc.).

Conventionally, the tasks are performed in a specific order (e.g., first task, then second task, then third task, etc.). Responsive to a specific task undergoing an interruption, such as a delay or failure (e.g., testing of a processing chamber is delayed or fails), all subsequent tasks in the order are also interrupted (e.g., the subsequent tasks in the order do not proceed until the specific task is accomplished). This causes large delays, delayed start-up times, and/or the like for assembly, testing, and use of substrate processing systems.

The devices, systems, and methods disclosed herein provide dynamic scheduling based on task dependencies (e.g., tool startup time operation). A processing device determines dependencies associated with tasks of a substrate processing system. In some embodiments, the tasks include assembly tasks, transfer tasks, processing tasks, and/or the like associated with components of the substrate processing system (e.g., load port, substrate carrier, side storage port, factory interface, load lock, transfer chamber, processing chamber, robot, and/or the like). In some examples, a testing task of a processing chamber depends on (e.g., directly depends on, has a dependency of) an assembly task of the processing chamber. In some examples, the assembly task and the testing task of the processing chamber do not depend on an assembly task of a side storage pod. In some embodiments, the dependencies are determined based on user input. In some embodiments, the dependencies are determined based on a dependency library (e.g., a library that includes dependencies of different tasks for different components of a substrate processing system). A processing device generates a dependency graph of the plurality of tasks. In some embodiments, the dependency graph is a directed acyclic graph (DAG). The processing device topologically sorts the dependency graph to generate one or more outputs. A schedule associated with processing of substrates in the substrate processing system is based on the one or more outputs. In some embodiments, the schedule is a dynamic schedule of tasks (e.g., assembly tasks, transferring tasks, processing tasks). If one task is unavailable (e.g., is interrupted, is delayed, fails), the processing device generates an updated schedule based on the dependencies and/or determines a subsequent task to perform that does not depend on the unavailable task. For example, responsive to the assembly task of the processing chamber failing, instead of delaying all other tasks, the processing device determines the assembly and testing tasks of the side storage pod do not depend on the assembly of the processing chamber, and causes the assembly and testing tasks of the side storage pod to be performed.

Aspects of the present disclosure result in technological advantages. The present disclosure provides for dynamic scheduling of tasks that is robust to delays and failures, such as fabrication constraints, facility delays, vendor delays, failure of a component, failure of a process, and/or the like. The present disclosure provides for continuing to perform other tasks that do not depend on the interrupted task compared to conventional systems that stop all other tasks when one task is interrupted. This allows the present disclosure to have less delays, quicker start-up times, and/or the like for assembly, testing, and use of substrate processing systems compared to conventional systems.

FIG. 1A is a block diagram illustrating an exemplary system 100 (exemplary system architecture), according to certain embodiments. The system 100 includes a client device 120, manufacturing equipment 124, sensors 126, metrology equipment 128, a predictive server 132, and a data store 140. In some embodiments, the predictive server 132 is part of a predictive system 130. In some embodiments, the predictive system 130 further includes server machines 170 and 180.

In some embodiments, one or more of the client device 120, manufacturing equipment 124, sensors 126, metrology equipment 128, predictive server 132, data store 140, server machine 170, and/or server machine 180 are coupled to each other via a network 136 for generating predictive data 160 (e.g., outputs indicative of a health of the processing chamber) to perform corrective actions. In some embodiments, network 136 is a public network that provides client device 120 with access to the predictive server 132, data store 140, and other publically available computing devices. In some embodiments, network 136 is a private network that provides client device 120 access to manufacturing equipment 124, sensors 126, metrology equipment 128, data store 140, and other privately available computing devices. In some embodiments, network 136 includes one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

In some embodiments, the client device 120 includes a computing device such as Personal Computers (PCs), laptops, mobile phones, smart phones, tablet computers, netbook computers, etc. In some embodiments, the client device 120 includes a scheduling component 122. Client device 120 includes an operating system that allows users to one or more of generate, view, or edit data (e.g., indication associated with manufacturing equipment 124, scheduling tasks associated with manufacturing equipment 124, etc.).

In some embodiments, scheduling component 122 receives user input (e.g., via a Graphical User Interface (GUI) displayed via the client device 120) of an indication associated with manufacturing equipment 124. In some embodiments, the scheduling component 122 transmits the indication to the predictive system 130, receives output (e.g., predictive data 160) from the predictive system 130, determines a schedule 166 associated with the manufacturing equipment 124 based on the output, and causes the schedule 166 to be implemented. In some embodiments, the scheduling component 122 obtains tasks 142 (e.g., current tasks 146) associated with the manufacturing equipment 124 (e.g., from data store 140, etc.) and provides the tasks 142 (e.g., current tasks 146) associated with the manufacturing equipment 124 to the predictive system 130. In some embodiments, the scheduling component 122 stores tasks 142 in the data store 140 and the predictive server 132 retrieves the tasks 142 from the data store 140. In some embodiments, the predictive server 132 stores output (e.g., predictive data 160) of the trained machine learning model 190 in the data store 140 and the client device 120 retrieves the output from the data store 140. In some embodiments, the scheduling component 122 receives an indication of a schedule 166 from the predictive system 130 and causes the schedule 166 to be implemented.

In some embodiments, the predictive server 132, server machine 170, and server machine 180 each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

The predictive server 132 includes a predictive component 134. In some embodiments, the predictive component 134 receives tasks 142 (e.g., receives from the client device 120, retrieves from the data store 140) and generates output (e.g., predictive data 160) for implementing a schedule 166 associated with the manufacturing equipment 124 based on the tasks 142. In some embodiments, the predictive component 134 uses one or more trained machine learning models 190 to determine the output for implementing a schedule 166 based on the tasks 142. In some embodiments, trained machine learning model 190 is trained using historical tasks 144 and historical dependencies 152.

In some embodiments, the predictive system 130 (e.g., predictive server 132, predictive component 134) generates predictive data 160 using supervised machine learning (e.g., supervised data set, labeled data set, etc.). In some embodiments, the predictive system 130 generates predictive data 160 using semi-supervised learning (e.g., semi-supervised data set, etc.). In some embodiments, the predictive system 130 generates predictive data 160 using unsupervised machine learning (e.g., unsupervised data set, clustering, etc.).

Figure 1B:
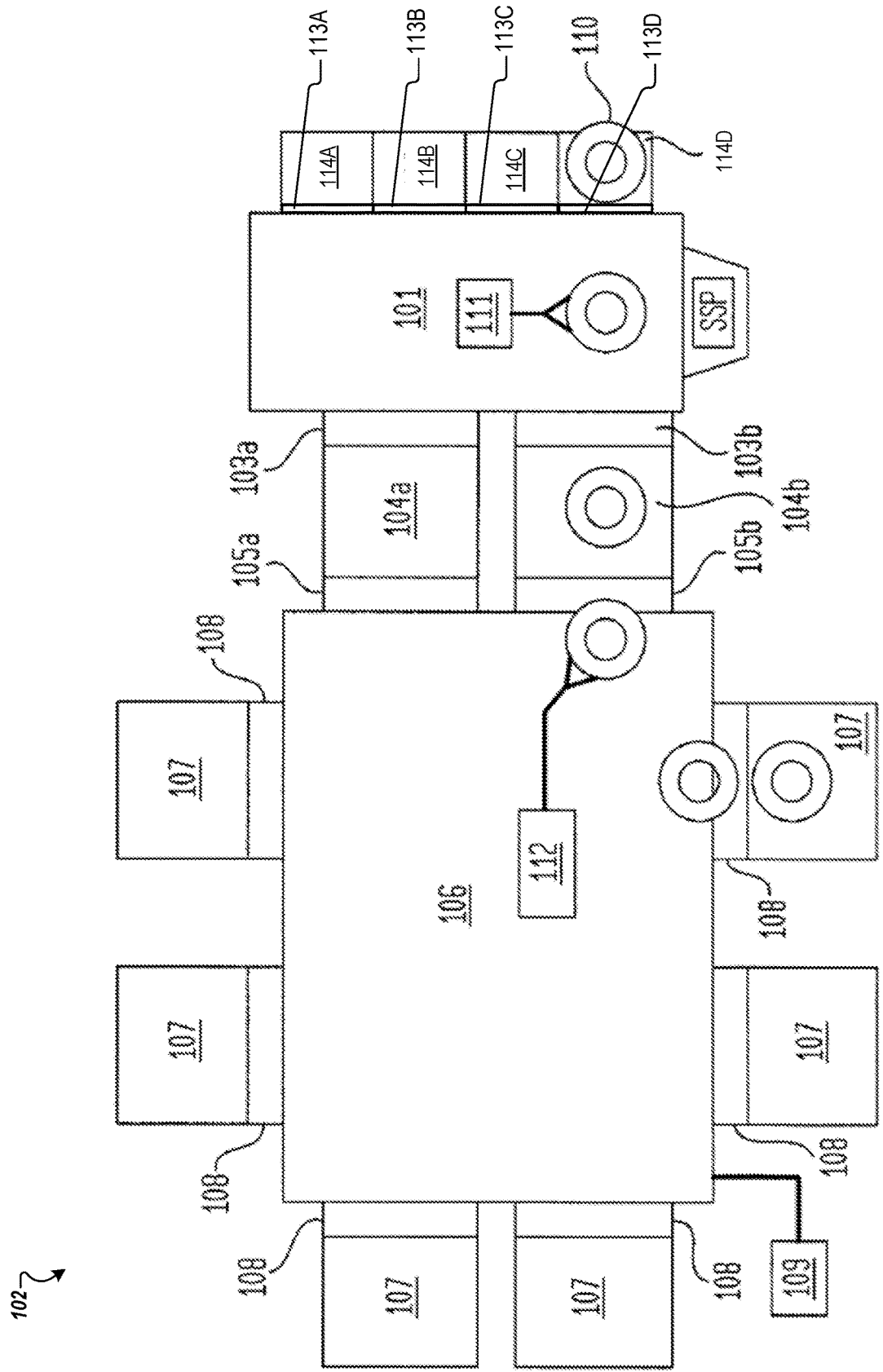
FIG. 1B illustrates a substrate processing system, according to certain embodiments.

In some embodiments, the manufacturing equipment 124 (e.g., cluster tool) is part of a substrate processing system (e.g., processing system 102 of FIG. 1B). In some embodiments, the manufacturing equipment 124 is used to produce substrates.

In some embodiments, the sensors 126 provide sensor data (e.g., performance data 168) associated with manufacturing equipment 124. In some embodiments, the sensors 126 provide sensor values (e.g., historical sensor values, current sensor values). In some embodiments, the sensors 126 include one or more of a pressure sensor, a temperature sensor, a flow rate sensor, and/or the like. In some embodiments, the sensor data is used for equipment health and/or product health (e.g., product quality). In some embodiments, sensor data is received over a period of time. In some embodiments, the sensor data includes values of one or more of leak rate, temperature, pressure, flow rate (e.g., gas flow), pumping efficiency, spacing (SP), High Frequency Radio Frequency (HFRF), electrical current, power, voltage, and/or the like. In some embodiments, sensor data is associated with or indicative of manufacturing parameters such as hardware parameters (e.g., settings or components, such as size, type, etc., of the manufacturing equipment 124) or process parameters of the manufacturing equipment. In some embodiments, sensor data is provided while the manufacturing equipment 124 performs manufacturing processes (e.g., equipment readings when processing products or components), before the manufacturing equipment 124 performs manufacturing processes, and/or after the manufacturing equipment 124 performs manufacturing processes. In some embodiments, the sensor data is provided while the manufacturing equipment 124 provides a sealed environment (e.g., the diffusion bonding chamber, substrate processing system, and/or processing chamber are closed.)

In some embodiments, the metrology equipment 128 is used to determine metrology data (e.g., inspection data, performance data 168) corresponding to products of the manufacturing equipment 124. In some examples, after the manufacturing equipment 124 performs one or more tasks 142, the metrology equipment 128 is used to inspect one or more portions of the manufacturing equipment 124 or content produced by the manufacturing equipment. In some examples, after the manufacturing equipment 124 deposits one or more layers on a substrate, the metrology equipment 128 is used to determine quality of the processed substrate (e.g., one or more of thicknesses of the layers, uniformity of the layers, interlayer spacing of the layer, and/or the like).

In some embodiments, the data store 140 is a memory (e.g., random access memory), a drive (e.g., a hard drive, a flash drive), a database system, or another type of component or device capable of storing data. In some embodiments, data store 140 includes multiple storage components (e.g., multiple drives or multiple databases) that span multiple computing devices (e.g., multiple server computers). In some embodiments, the data store 140 stores one or more of tasks 142, dependencies 150, predictive data 160, dependency graph 162, topologically sorted output 164, schedule 166, and/or performance data 168.

Tasks 142 includes historical tasks 144 and current tasks 146. In some embodiments, the tasks 142 include one or more of assembly tasks associated with assembly of the manufacturing equipment 124, transferring tasks associated with transferring content within the manufacturing equipment 124, processing tasks associated with processing content within the manufacturing equipment 124, testing tasks associated with testing one or more portions of the manufacturing equipment 124, and/or the like. In some embodiments, the tasks 142 are associated with one or more of assembly, testing, commissioning, tool startup, and/or the like associated with manufacturing equipment 124. In some embodiments, a set of tasks 142 (e.g., assembly, testing, transfer, processing, and/or the like) are associated with each component of the manufacturing equipment 124 (e.g., load port, substrate carrier, side storage port, factory interface, load lock, transfer chamber, processing chamber, robot, and/or the like). In some embodiments, the tasks 142 are tier 1 tasks (e.g., associated with assembly, inspection, and/or testing of manufacturing equipment 124.)

Dependencies 150 includes historical dependencies 152 and current dependencies 154. In some embodiments, the dependencies 150 indicate dependency between one or more of the tasks 142. In some embodiments, the dependencies indicate that a second task is dependent on a first task (e.g., the first task is to be performed before the second task can be performed) and that a third task is not dependent on the first or second tasks (e.g., the third task can be performed without waiting for the first and/or second tasks to be performed). In some embodiments, one or more of the dependencies 150 are associated with tasks 142 for the same component of the manufacturing equipment 124 (e.g., a testing task of a processing chamber is dependent upon an assembly task of the processing chamber).

Historical data includes one or more of historical tasks 144 and/or historical dependencies 152 (e.g., at least a portion for training the machine learning model 190). Current data includes one or more of current tasks 146 and/or current dependencies 154 (e.g., at least a portion to be input into the trained machine learning model 190 subsequent to training the model 190 using the historical data) for which predictive data 160 is generated (e.g., for generating a schedule 166). In some embodiments, the current data is used for retaining the trained machine learning model 190.

In some embodiments, the predictive data 160 is indicative of predictive dependencies 150 of the tasks 142 associated with the manufacturing equipment 124.

In some embodiments, a dependency graph 162 is generated based on the tasks 142 and the dependencies 150. In some embodiments, the dependency graph 162 is topologically sorted to generate the topologically sorted output 164. In some embodiments, the topologically sorted output 164 is indicative of the predictive data 160. In some embodiments, a schedule is based on one or more of the predictive data 160 and/or the dependencies 150.

In some embodiments, the performance data 168 includes sensor data (e.g., from sensors 126), metrology data (e.g., from metrology equipment 128), and/or user input (e.g., via client device 120). In some embodiments, the performance data 168 indicates whether there is an error in a task 142, such as an error in assembly of the manufacturing equipment 124, an error in use of the manufacturing equipment 124, an error in transferring of content, an error in processing of content, and/or the like. In some embodiments, the performance data 168 indicates whether the manufacturing equipment 124 is functioning properly. In some embodiments, at least a portion of the performance data 168 is associated with a quality of products produced by the manufacturing equipment 124. In some embodiments, at least a portion of the performance data 168 is based on metrology data from the metrology equipment 128 (e.g., metrology data indicating properly processed substrates, property data of substrates, yield, etc.). In some embodiments, at least a portion of the performance data 168 is based on inspection of the manufacturing equipment 124 (e.g., based on verification of actual inspection). In some embodiments, the performance data 168 includes an indication of an absolute value (e.g., inspection data of the content produced and/or manufacturing equipment 124 indicates missing a threshold value by a calculated value) or a relative value (e.g., inspection data of the content produced and/or manufacturing equipment 124 indicates missing a threshold value by a percentage value). In some embodiments, the performance data 168 is indicative of meeting a threshold amount of error (e.g., at least 5% error in production, at least 5% error in flow, at least 5% error in deformation, specification limit).

In some embodiments, the client device 120 provides performance data 168 (e.g., product data, equipment data). In some examples, the client device 120 provides (e.g., based on user input) performance data 168 that indicates an abnormality in products (e.g., defective products) and/or manufacturing equipment 124 (e.g., component failure, maintenance, energy usage, variance of a component compared to similar components, etc.). In some embodiments, the performance data 168 includes an amount of products that have been produced that were normal or abnormal (e.g., 98% normal products). In some embodiments, the performance data 168 indicates an amount of products that are being produced that are predicted as normal or abnormal. In some embodiments, the performance data 168 includes one or more of yield a previous batch of products, average yield, predicted yield, predicted amount of defective or non-defective product, or the like. In some examples, responsive to yield on a first batch of product being 98% (e.g., 98% of the products were normal and 2% were abnormal), the client device 120 provides performance data 168 indicating that the upcoming batch of product is to have a yield of 98%.

In some embodiments, the performance data 168 indicates a task 142 that is unavailable (e.g., has an error, is delayed, failed, and/or the like). Responsive to a task 142 being unavailable, a corrective action is performed. In some embodiments, the corrective action includes updating schedule 166. In some embodiments, the corrective action includes determining a task 142 to perform that is not dependent on the unavailable task. In some embodiments, the corrective action includes providing an alert (e.g., an alarm indicative of the unavailable task). In some embodiments, the corrective action includes interrupting at least a portion of the functionality of the manufacturing equipment 124.

In some embodiments, predictive system 130 further includes server machine 170 and server machine 180. Server machine 170 includes a data set generator 172 that is capable of generating data sets (e.g., a set of data inputs and a set of target outputs) to train, validate, and/or test a machine learning model(s) 190. Some operations of data set generator 172 are described in detail below with respect to FIGS. 2 and 5B. In some embodiments, the data set generator 172 partitions the historical data (e.g., historical tasks 144 and historical dependencies 152) into a training set (e.g., sixty percent of the historical data), a validating set (e.g., twenty percent of the historical data), and a testing set (e.g., twenty percent of the historical data). In some embodiments, the predictive system 130 (e.g., via predictive component 134) generates multiple sets of features. In some examples a first set of features corresponds to a first set of types of parameters (e.g., from a first set of sensors, first combination of values from first set of sensors, first patterns in the values from the first set of sensors) that correspond to each of the data sets (e.g., training set, validation set, and testing set) and a second set of features correspond to a second set of types of parameters (e.g., from a second set of sensors different from the first set of sensors, second combination of values different from the first combination, second patterns different from the first patterns) that correspond to each of the data sets.

Server machine 180 includes a training engine 182, a validation engine 184, selection engine 185, and/or a testing engine 186. In some embodiments, an engine (e.g., training engine 182, a validation engine 184, selection engine 185, and a testing engine 186) refers to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 is capable of training a machine learning model 190 using one or more sets of features associated with the training set from data set generator 172. In some embodiments, the training engine 182 generates multiple trained machine learning models 190, where each trained machine learning model 190 corresponds to a distinct set of features of the training set (e.g., parameters from a distinct set of sensors). In some examples, a first trained machine learning model was trained using all features (e.g., X1-X5), a second trained machine learning model was trained using a first subset of the features (e.g., X1, X2, X4), and a third trained machine learning model was trained using a second subset of the features (e.g., X1, X3, X4, and X5) that partially overlaps the first subset of features.

The validation engine 184 is capable of validating a trained machine learning model 190 using a corresponding set of features of the validation set from data set generator 172. For example, a first trained machine learning model 190 that was trained using a first set of features of the training set is validated using the first set of features of the validation set. The validation engine 184 determines an accuracy of each of the trained machine learning models 190 based on the corresponding sets of features of the validation set. The validation engine 184 discards trained machine learning models 190 that have an accuracy that does not meet a threshold accuracy. In some embodiments, the selection engine 185 is capable of selecting one or more trained machine learning models 190 that have an accuracy that meets a threshold accuracy. In some embodiments, the selection engine 185 is capable of selecting the trained machine learning model 190 that has the highest accuracy of the trained machine learning models 190.

The testing engine 186 is capable of testing a trained machine learning model 190 using a corresponding set of features of a testing set from data set generator 172. For example, a first trained machine learning model 190 that was trained using a first set of features of the training set is tested using the first set of features of the testing set. The testing engine 186 determines a trained machine learning model 190 that has the highest accuracy of all of the trained machine learning models based on the testing sets.

In some embodiments, the machine learning model 190 refers to the model artifact that is created by the training engine 182 using a training set that includes data inputs and corresponding target outputs (correct answers for respective training inputs). Patterns in the data sets can be found that map the data input to the target output (the correct answer), and the machine learning model 190 is provided mappings that captures these patterns. In some embodiments, the machine learning model 190 uses one or more of Support Vector Machine (SVM), Radial Basis Function (RBF), clustering, supervised machine learning, semi-supervised machine learning, unsupervised machine learning, k-Nearest Neighbor algorithm (k-NN), linear regression, random forest, neural network (e.g., artificial neural network), etc. In some embodiments, the machine learning model 190 is a multi-variable analysis (MVA) model.

Predictive component 134 provides current tasks 146 to the trained machine learning model 190 and runs the trained machine learning model 190 on the input to obtain one or more outputs. The predictive component 134 is capable of determining (e.g., extracting) predictive data 160 from the output of the trained machine learning model 190 and determines (e.g., extract) confidence data from the output that indicates a level of confidence that the predictive data 160 corresponds to current dependencies 154 of the manufacturing equipment 124 at the current tasks 146. In some embodiments, the predictive component 134 or scheduling component 122 use the confidence data to decide whether to generate a schedule 166 associated with the manufacturing equipment 124 based on the predictive data 160.

The confidence data includes or indicates a level of confidence that the predictive data 160 corresponds to current dependencies 154 (e.g., model 190) of the manufacturing equipment 124 at the current tasks 146. In one example, the level of confidence is a real number between 0 and 1 inclusive, where 0 indicates no confidence that the predictive data 160 corresponds to current dependencies 154 associated with the current tasks 146 and 1 indicates absolute confidence that the predictive data 160 corresponds to current dependencies 154 associated with the current tasks 146. In some embodiments, the system 100 uses predictive system 130 to determine predictive data 160 instead of processing substrates and using the metrology equipment 128 to determine current dependencies 154. In some embodiments, responsive to the confidence data indicating a level of confidence that is below a threshold level, the system 100 causes processing of substrates and causes the metrology equipment 128 to generate the current dependencies 154. Responsive to the confidence data indicating a level of confidence below a threshold level for a predetermined number of instances (e.g., percentage of instances, frequency of instances, total number of instances, etc.) the predictive component 134 causes the trained machine learning model 190 to be re-trained (e.g., based on the current tasks 146 and current dependencies 154, etc.).

Figure 2:
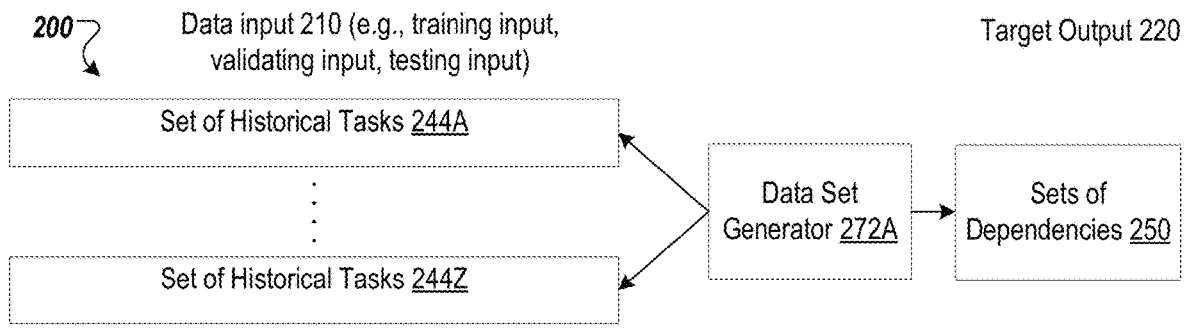
FIG. 2 illustrates a data set generator to create data sets for a machine learning model, according to certain embodiments.

For purpose of illustration, rather than limitation, aspects of the disclosure describe the training of one or more machine learning models 190 using historical data (e.g., historical tasks 144 and historical dependencies 152) and inputting current data (e.g., current tasks 146) into the one or more trained machine learning models 190 to determine predictive data 160 (e.g., current dependencies 154). In other implementations, a heuristic model or rule-based model (e.g., dependencies library) is used to determine predictive data 160 (e.g., without using a trained machine learning model). Predictive component 134 monitors historical tasks 144 and historical dependencies 152. In some embodiments, any of the information described with respect to data inputs 210 of FIG. 2 are monitored or otherwise used in the heuristic or rule-based model.

In some embodiments, the functions of client device 120, predictive server 132, server machine 170, and server machine 180 are be provided by a fewer number of machines. For example, in some embodiments, server machines 170 and 180 are integrated into a single machine, while in some other embodiments, server machine 170, server machine 180, and predictive server 132 are integrated into a single machine. In some embodiments, client device 120 and predictive server 132 are integrated into a single machine.

In general, functions described in one embodiment as being performed by client device 120, predictive server 132, server machine 170, and server machine 180 can also be performed on predictive server 132 in other embodiments, if appropriate. In addition, the functionality attributed to a particular component can be performed by different or multiple components operating together. For example, in some embodiments, the predictive server 132 determines the corrective action based on the predictive data 160. In another example, client device 120 determines the predictive data 160 based on output from the trained machine learning model.

In addition, the functions of a particular component can be performed by different or multiple components operating together. In some embodiments, one or more of the predictive server 132, server machine 170, or server machine 180 are accessed as a service provided to other systems or devices through appropriate application programming interfaces (API).

In some embodiments, a "user" is represented as a single individual. However, other embodiments of the disclosure encompass a "user" being an entity controlled by a plurality of users and/or an automated source. In some examples, a set of individual users federated as a group of administrators is considered a "user."

Although embodiments of the disclosure are discussed in terms of generating predictive data 160 to cause schedules 166 to be generated for manufacturing facilities (e.g., substrate processing facilities), in some embodiments, the disclosure can also be generally applied to scheduling (e.g., dynamic scheduling) and/or determining dependencies based on different types of data.

FIG. 1B illustrates a processing system 102 (e.g., wafer processing system, substrate processing system, semiconductor processing system) according to certain embodiments. In some embodiments, manufacturing equipment 124 of FIG. 1A includes processing system 102.

The processing system 102 includes a factory interface 101 and load ports 113 (e.g., load ports 113A-D). In some embodiments, the load ports 113A-D are directly mounted to (e.g., sealed against) the factory interface 101. Enclosure systems 114 (e.g., cassette, front opening unified pod (FOUP), process kit enclosure system, or the like) are configured to removably couple (e.g., dock) to the load ports 113A-D. Referring to FIG. 1B, enclosure system 114A is coupled to load port 113A, enclosure system 114B is coupled to load port 113B, enclosure system 114C is coupled to load port 113C, and enclosure system 114D is coupled to load port 113D. In some embodiments, one or more enclosure systems 114 are coupled to the load ports 113 for transferring wafers and/or other substrates into and out of the processing system 102. Each of the enclosure systems 114 seal against a respective load port 113. In some embodiments, a first enclosure system 114A is docked to a load port 113A (e.g., for replacing used process kit rings). Once such operation or operations are performed, the first enclosure system 114A is then undocked from the load port 113A, and then a second enclosure system 114 (e.g., a FOUP containing wafers) is docked to the same load port 113A. In some embodiments, an enclosure system 114 (e.g., enclosure system 114A) is an enclosure system with shelves for aligning carriers and/or process kit rings.

In some embodiments, a load port 113 includes a front interface that forms a vertical opening (or a substantially vertical opening). The load port 113 additionally includes a horizontal surface for supporting an enclosure system 114 (e.g., cassette, process kit enclosure system). Each enclosure system 114 (e.g., FOUP of wafers, process kit enclosure system) has a front interface that forms a vertical opening. The front interface of the enclosure system 114 is sized to interface with (e.g., seal to) the front interface of the load port 113 (e.g., the vertical opening of the enclosure system 114 is approximately the same size as the vertical opening of the load port 113). The enclosure system 114 is placed on the horizontal surface of the load port 113 and the vertical opening of the enclosure system 114 aligns with the vertical opening of the load port 113. The front interface of the enclosure system 114 interconnects with (e.g., clamp to, be secured to, be sealed to) the front interface of the load port 113. A bottom plate (e.g., base plate) of the enclosure system 114 has features (e.g., load features, such as recesses or receptacles, that engage with load port kinematic pin features, a load port feature for pin clearance, and/or an enclosure system docking tray latch clamping feature) that engage with the horizontal surface of the load port 113. The same load ports 113 that are used for different types of enclosure systems 114 (e.g., process kit enclosure system, cassettes that contain wafers, etc.).

In some embodiments, the enclosure system 114 (e.g., process kit enclosure system) includes one or more items of content 110 (e.g., one or more of a process kit ring, an empty process kit ring carrier, a process kit ring disposed on a process kit ring carrier, a placement validation wafer, etc.). In some examples, the enclosure system 114 is coupled to the factory interface 101 (e.g., via load port 113) to enable automated transfer of a process kit ring on a process kit ring carrier into the processing system 102 for replacement of a used process kit ring.

In some embodiments, the processing system 102 also includes first vacuum ports 103a, 103b coupling the factory interface 101 to respective degassing chambers 104a, 104b. Second vacuum ports 105a, 105b are coupled to respective degassing chambers 104a, 104b and disposed between the degassing chambers 104a, 104b and a transfer chamber 106 to facilitate transfer of wafers and content 110 (e.g., process kit rings) into the transfer chamber 106. In some embodiments, a processing system 102 includes and/or uses one or more degassing chambers 104 and a corresponding number of vacuum ports 103, 105 (e.g., a processing system 102 includes a single degassing chamber 104, a single first vacuum port 103, and a single second vacuum port 105). The transfer chamber 106 includes a plurality of processing chambers 107 (e.g., four processing chambers 107, six processing chambers 107, etc.) disposed therearound and coupled thereto. The processing chambers 107 are coupled to the transfer chamber 106 through respective ports 108, such as slit valves or the like. In some embodiments, the factory interface 101 is at a higher pressure (e.g., atmospheric pressure) and the transfer chamber 106 is at a lower pressure (e.g., vacuum). Each degassing chamber 104 (e.g., loadlock, pressure chamber) has a first door (e.g., first vacuum port 103) to seal the degassing chamber 104 from the factory interface 101 and a second door (e.g., second vacuum port 105) to seal the degassing chamber 104 from the transfer chamber 106. Content is to be transferred from the factory interface 101 into a degassing chamber 104 while the first door is open and the second door is closed, the first door is to close, the pressure in the degassing chamber 104 is to be reduced to match the transfer chamber 106, the second door is to open, and the content is to be transferred out of the degassing chamber 104. A local center finding (LCF) device is to be used to align the content in the transfer chamber 106 (e.g., before entering a processing chamber 107, after leaving the processing chamber 107).

In some embodiments, the processing chambers 107 includes or more of etch chambers, deposition chambers (including atomic layer deposition, chemical vapor deposition, physical vapor deposition, or plasma enhanced versions thereof), anneal chambers, or the like.

Factory interface 101 includes a factory interface robot 111. Factory interface robot 111 includes a robot arm, such as a selective compliance assembly robot arm (SCARA) robot. Examples of a SCARA robot include a 2 link SCARA robot, a 3 link SCARA robot, a 4 link SCARA robot, and so on. The factory interface robot 111 includes an end effector on an end of the robot arm. The end effector is configured to pick up and handle specific objects, such as wafers. Alternatively, or additionally, the end effector is configured to handle objects such as a carrier and/or process kit rings (edge rings). The robot arm has one or more links or members (e.g., wrist member, upper arm member, forearm member, etc.) that are configured to be moved to move the end effector in different orientations and to different locations. The factory interface robot 111 is configured to transfer objects between enclosure systems 114 (e.g., cassettes, FOUPs) and degassing chambers 104a, 104b (or load ports).

Transfer chamber 106 includes a transfer chamber robot 112. Transfer chamber robot 112 includes a robot arm with an end effector at an end of the robot arm. The end effector is configured to handle particular objects, such as wafers. In some embodiments, the transfer chamber robot 112 is a SCARA robot, but has fewer links and/or fewer degrees of freedom than the factory interface robot 111 in some embodiments.

A controller 109 controls various aspects of the processing system 102. The controller 109 is and/or includes a computing device such as a personal computer, a server computer, a programmable logic controller (PLC), a microcontroller, and so on. The controller 109 includes one or more processing devices, which, in some embodiments, are general-purpose processing devices such as a microprocessor, central processing unit, or the like. More particularly, in some embodiments, the processing device is a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device is one or more special-purpose processing devices such as an application specific integrated circuit (ASIC), a field programmable gate array (FPGA), a digital signal processor (DSP), network processor, or the like. In some embodiments, the controller 109 includes a data storage device (e.g., one or more disk drives and/or solid state drives), a main memory, a static memory, a network interface, and/or other components. In some embodiments, the controller 109 executes instructions to perform any one or more of the methods or processes described herein. The instructions are stored on a computer readable storage medium, which include one or more of the main memory, static memory, secondary storage and/or processing device (during execution of the instructions). The controller 109 receives signals from and sends controls to factory interface robot 111 and wafer transfer chamber robot 112 in some embodiments.

FIG. 1B schematically illustrates transfer of content 110 (e.g., a process kit ring coupled to a process kit ring carrier, a substrate disposed on a carrier, a substrate, etc.) into a processing chamber 107. According to one aspect of the disclosure, content 110 is removed from an enclosure system 114 via factory interface robot 111 located in the factory interface 101. The factory interface robot 111 transfers the content 110 through one of the first vacuum ports 103a, 103b and into a respective degassing chamber 104a, 104b. A transfer chamber robot 112 located in the transfer chamber 106 removes the content 110 from one of the degassing chambers 104a, 104b through a second vacuum port 105a or 105b. The transfer chamber robot 112 moves the content 110 into the transfer chamber 106, where the content 110 is transferred to a processing chamber 107 though a respective port 108. While not shown for clarity in FIG. 1B, transfer of the content 110 includes transfer of a process kit ring disposed on a process kit ring carrier, transfer of an empty process kit ring carrier, transfer of a placement validation wafer, etc.

FIG. 1B illustrates one example of transfer of content 110, however, other examples are also contemplated. In some examples, it is contemplated that the enclosure system 114 is coupled to the transfer chamber 106 (e.g., via a load port mounted to the transfer chamber 106). From the transfer chamber 106, the content 110 is to be loaded into a processing chamber 107 by the transfer chamber robot 112. Additionally, in some embodiments, content 110 is loaded in a substrate support pedestal (SSP). In some embodiments, an additional SSP is positioned in communication with the factory interface 101 opposite the illustrated SSP. Processed content 110 (e.g., a used process kit ring) is to be removed from the processing system 102 in reverse of any manner described herein. When utilizing multiple enclosure systems 114 or a combination of enclosure system 114 and SSP, in some embodiments, one SSP or enclosure system 114 is to be used for unprocessed content 110 (e.g., new process kit rings), while another SSP or enclosure system 114 is to be used for receiving processed content 110 (e.g., used process kit rings).

The processing system 102 includes chambers, such as factory interface 101 (e.g., equipment front end module (EFEM)), transfer chamber 106, and adjacent chambers (e.g., load port 113, enclosure system 114, SSP, degassing chamber 104 such as a loadlock, processing chambers 107, or the like) that are adjacent to the factory interface 101 and/or the transfer chamber 106. One or more of the chambers is sealed (e.g., each of the chambers is sealed). The adjacent chambers are sealed to the factory interface 101 and/or the transfer chamber 106. In some embodiments, inert gas (e.g., one or more of nitrogen, argon, neon, helium, krypton, or xenon) is provided into one or more of the chambers (e.g., the factory interface 101, transfer chamber 106, and/or adjacent chambers) to provide one or more inert environments. In some examples, the factory interface 101 is an inert EFEM that maintains the inert environment (e.g., inert EFEM minienvironment) within the factory interface 101 so that users do not need to enter the factory interface 101 (e.g., the processing system 102 is configured for no manual access within the factory interface 101).

In some embodiments, gas flow (e.g., providing inert gas, providing nitrogen, exhausting gas to provide a vacuum environment, etc.) is provided into and/or from one or more chambers (e.g., factory interface 101, transfer chamber 106, adjacent chambers, etc.) of the processing system 102.

In some embodiments, the gas flow is greater than leakage through the one or more chambers to maintain a positive pressure within the one or more chambers. In some embodiments, the exhausted gas flow is greater than leakage through the one or more chambers to maintain a negative pressure within the one or more chambers.

In some embodiments, the inert gas within the factory interface 101 is recirculated. In some embodiments, a portion of the inert gas is exhausted. In some embodiments, the gas flow of non-recirculated gas into the one or more chambers is greater than the exhausted gas flow and the gas leakage to maintain a positive pressure of inert gas within the one or more chambers. In some embodiments, exhausted gas flow out of the one or more chambers is greater than gas leakage (e.g., and gas flow) into the one or more chambers to maintain a negative pressure (e.g., vacuum environment) within the one or more chambers.

In some embodiments, the one or more chambers are coupled to one or more valves and/or pumps to provide the gas flow into and/or out of the one or more chambers. A processing device (e.g., of controller 109) controls the gas flow into and out of the one or more chambers. In some embodiments, the processing device receives sensor data from one or more sensors (e.g., oxygen sensor, moisture sensor, motion sensor, door actuation sensor, temperature sensor, pressure sensor, etc.) and determines, based on the sensor data, the flow rate of inert gas flowing into and/or flow rate of gas flowing out of the one or more chambers.

In some embodiments, processing system 102 is assembled, tested, used for transferring content 110, used for processing content 110, and/or the like via tasks 142 of FIG. 1A. One or more of the tasks 142 are dependent on one or more corresponding tasks 142. In some embodiments, system 100 of FIG. 1A generates a schedule of the tasks for processing system 102 of FIG. 1B.

FIG. 2 illustrates a data set generator 272 (e.g., data set generator 172 of FIG. 1A) to create data sets for a machine learning model (e.g., model 190 of FIG. 1A), according to certain embodiments. In some embodiments, data set generator 272 is part of server machine 170 of FIG. 1A.

Data set generator 272 (e.g., data set generator 172 of FIG. 1A) creates data sets for a machine learning model (e.g., model 190 of FIG. 1A). Data set generator 272 creates data sets using historical tasks 244 (e.g., historical tasks 144 of FIG. 1A) and historical dependencies 252 (e.g., historical dependencies 152 of FIG. 1A). System 200 of FIG. 2 shows data set generator 272, data inputs 210, and target output 220.

In some embodiments, data set generator 272 generates a data set (e.g., training set, validating set, testing set) that includes one or more data inputs 210 (e.g., training input, validating input, testing input) and one or more target outputs 220 that correspond to the data inputs 210. The data set also includes mapping data that maps the data inputs 210 to the target outputs 220. Data inputs 210 are also referred to as "features," "attributes," or information." In some embodiments, data set generator 272 provides the data set to the training engine 182, validating engine 184, or testing engine 186, where the data set is used to train, validate, or test the machine learning model 190. Some embodiments of generating a training set are further described with respect to FIG. 5B.

In some embodiments, data set generator 272 generates the data input 210 and target output 220. In some embodiments, data inputs 210 include one or more sets of historical tasks 244.

In some embodiments, data set generator 272 generates a first data input corresponding to a first set of historical tasks 244A to train, validate, or test a first machine learning model and the data set generator 272 generates a second data input corresponding to a second set of historical tasks 244B to train, validate, or test a second machine learning model.

In some embodiments, the data set generator 272 discretizes (e.g., segments) one or more of the data input 210 or the target output 220 (e.g., to use in classification algorithms for regression problems). Discretization (e.g., segmentation via a sliding window) of the data input 210 or target output 220 transforms continuous values of variables into discrete values. In some embodiments, the discrete values for the data input 210 indicate discrete historical tasks 244 to obtain a target output 220 (e.g., discrete dependencies 250).

Data inputs 210 and target outputs 220 to train, validate, or test a machine learning model include information for a particular facility (e.g., for a particular substrate manufacturing facility). In some examples, historical tasks 244 and historical dependencies 252 are for the same manufacturing facility.

In some embodiments, the information used to train the machine learning model is from specific types of manufacturing equipment 124 of the manufacturing facility having specific characteristics and allow the trained machine learning model to determine outcomes for a specific group of manufacturing equipment 124 based on input for current tasks (e.g., current tasks 146) associated with one or more components sharing characteristics of the specific group. In some embodiments, the information used to train the machine learning model is for components from two or more manufacturing facilities and allows the trained machine learning model to determine outcomes for components based on input from one manufacturing facility.

In some embodiments, subsequent to generating a data set and training, validating, or testing a machine learning model 190 using the data set, the machine learning model 190 is further trained, validated, or tested (e.g., current dependencies 154 of FIG. 1A) or adjusted (e.g., adjusting weights associated with input data of the machine learning model 190, such as connection weights in a neural network).

Figure 3:
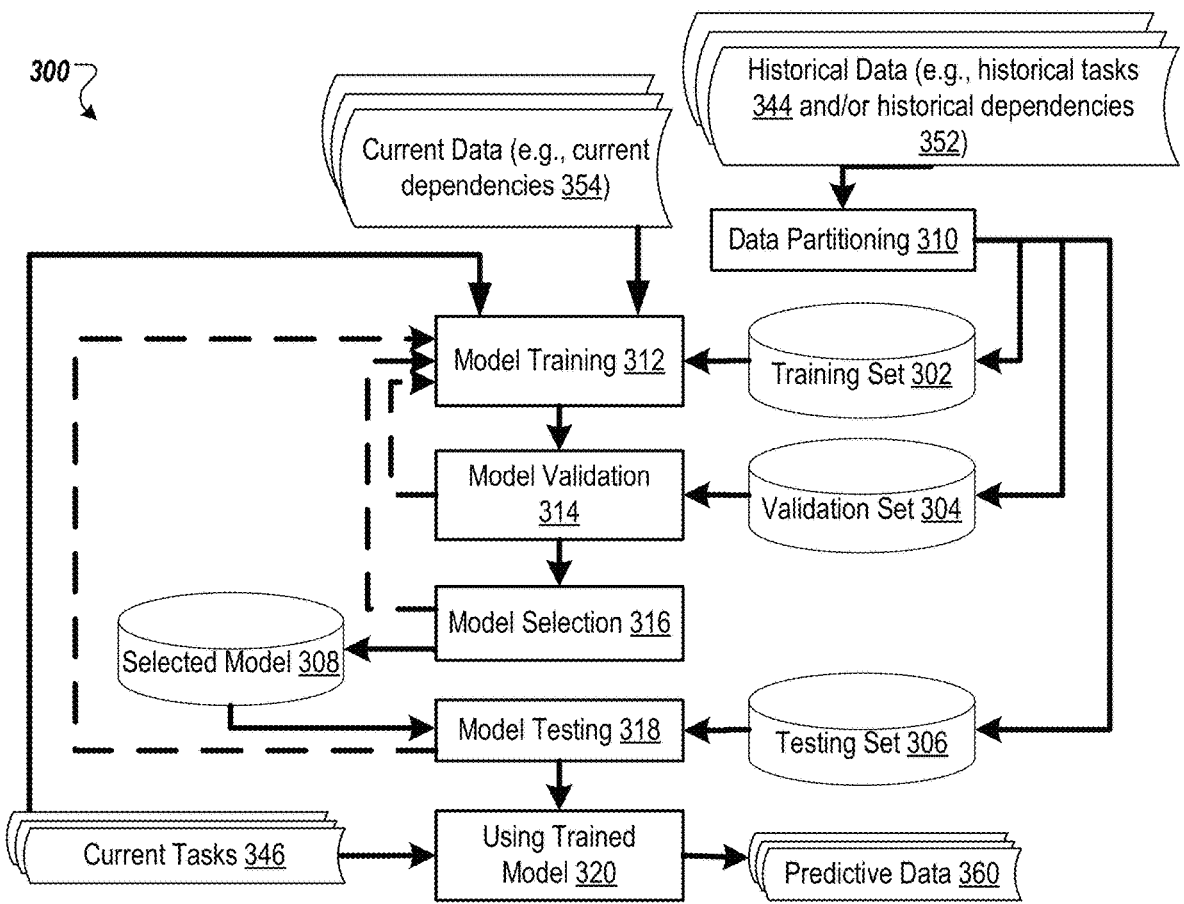
FIG. 3 is a block diagram illustrating determining predictive data, according to certain embodiments.

FIG. 3 is a block diagram illustrating a system 300 for generating predictive data 360 (e.g., predictive data 160 of FIG. 1A), according to certain embodiments. The system 300 is used to determine predictive data 360 (e.g., model 190 of FIG. 1A) to cause a schedule to be generated (e.g., associated with tasks of manufacturing equipment 124).

At block 310, the system 300 (e.g., predictive system 130 of FIG. 1A) performs data partitioning (e.g., via data set generator 172 of server machine 170 of FIG. 1A) of the historical data (e.g., historical tasks 344 and historical dependencies 352 for model 190 of FIG. 1A) to generate the training set 302, validation set 304, and testing set 306. In some examples, the training set is 60% of the historical data, the validation set is 20% of the historical data, and the testing set is 20% of the historical data. The system 300 generates a plurality of sets of features for each of the training set, the validation set, and the testing set.

At block 312, the system 300 performs model training (e.g., via training engine 182 of FIG. 1A) using the training set 302. In some embodiments, the system 300 trains multiple models using multiple sets of features of the training set 302 (e.g., a first set of features of the training set 302, a second set of features of the training set 302, etc.). For example, system 300 trains a machine learning model to generate a first trained machine learning model using the first set of features in the training set and to generate a second trained machine learning model using the second set of features in the training set. In some embodiments, the first trained machine learning model and the second trained machine learning model are combined to generate a third trained machine learning model (e.g., which is a better predictor than the first or the second trained machine learning model on its own in some embodiments). In some embodiments, sets of features used in comparing models overlap. In some embodiments, hundreds of models are generated including models with various permutations of features and combinations of models.

At block 314, the system 300 performs model validation (e.g., via validation engine 184 of FIG. 1A) using the validation set 304. The system 300 validates each of the trained models using a corresponding set of features of the validation set 304. For example, system 300 validates the first trained machine learning model using the first set of features in the validation set and the second trained machine learning model using the second set of features in the validation set. In some embodiments, the system 300 validates hundreds of models (e.g., models with various permutations of features, combinations of models, etc.) generated at block 312. At block 314, the system 300 determines an accuracy of each of the one or more trained models (e.g., via model validation) and determines whether one or more of the trained models has an accuracy that meets a threshold accuracy. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. The system 300 discards the trained machine learning models that have an accuracy that is below the threshold accuracy (e.g., based on the validation set).

At block 316, the system 300 performs model selection (e.g., via selection engine 185 of FIG. 1A) to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow returns to block 312 where the system 300 performs model training using further refined training sets corresponding to further refined sets of features for determining a trained model that has the highest accuracy.

At block 318, the system 300 performs model testing (e.g., via testing engine 186 of FIG. 1A) using the testing set 306 to test the selected model 308. The system 300 tests, using the first set of features in the testing set, the first trained machine learning model to determine the first trained machine learning model meets a threshold accuracy (e.g., based on the first set of features of the testing set 306). Responsive to accuracy of the selected model 308 not meeting the threshold accuracy (e.g., the selected model 308 is overly fit to the training set 302 and/or validation set 304 and is not applicable to other data sets such as the testing set 306), flow continues to block 312 where the system 300 performs model training (e.g., retraining) using different training sets corresponding to different sets of features. Responsive to determining that the selected model 308 has an accuracy that meets a threshold accuracy based on the testing set 306, flow continues to block 320. In at least block 312, the model learns patterns in the historical data to make predictions and in block 318, the system 300 applies the model on the remaining data (e.g., testing set 306) to test the predictions.

At block 320, system 300 uses the trained model (e.g., selected model 308) to receive current tasks 346 (e.g., current tasks 146 of FIG. 1A) and determines (e.g., extracts), from the output of the trained model, predictive data 360 (e.g., predictive data 160 of FIG. 1A) to cause a schedule to be generated for performing the current tasks 346 associated with the manufacturing equipment 124. In some embodiments, the current tasks 346 corresponds to the same types of features in the historical parameters. In some embodiments, the current tasks 346 correspond to a same type of features as a subset of the types of features in historical tasks 344 that are used to train the selected model 308.

In some embodiments, current data is received. In some embodiments, current data includes current dependencies 354 (e.g., current dependencies 154 of FIG. 1A). In some embodiments, the current data is received from metrology equipment (e.g., metrology equipment 128 of FIG. 1A), sensors (e.g., sensors 126 of FIG. 1A), or via user input. The model 308 is re-trained based on the current data. In some embodiments, a new model is trained based on the current data and the current tasks 346.

In some embodiments, one or more of the operations 310-320 occur in various orders and/or with other operations not presented and described herein. In some embodiments, one or more of operations 310-320 are not be performed. For example, in some embodiments, one or more of data partitioning of block 310, model validation of block 314, model selection of block 316, and/or model testing of block 318 are not be performed.

Figure 4A:
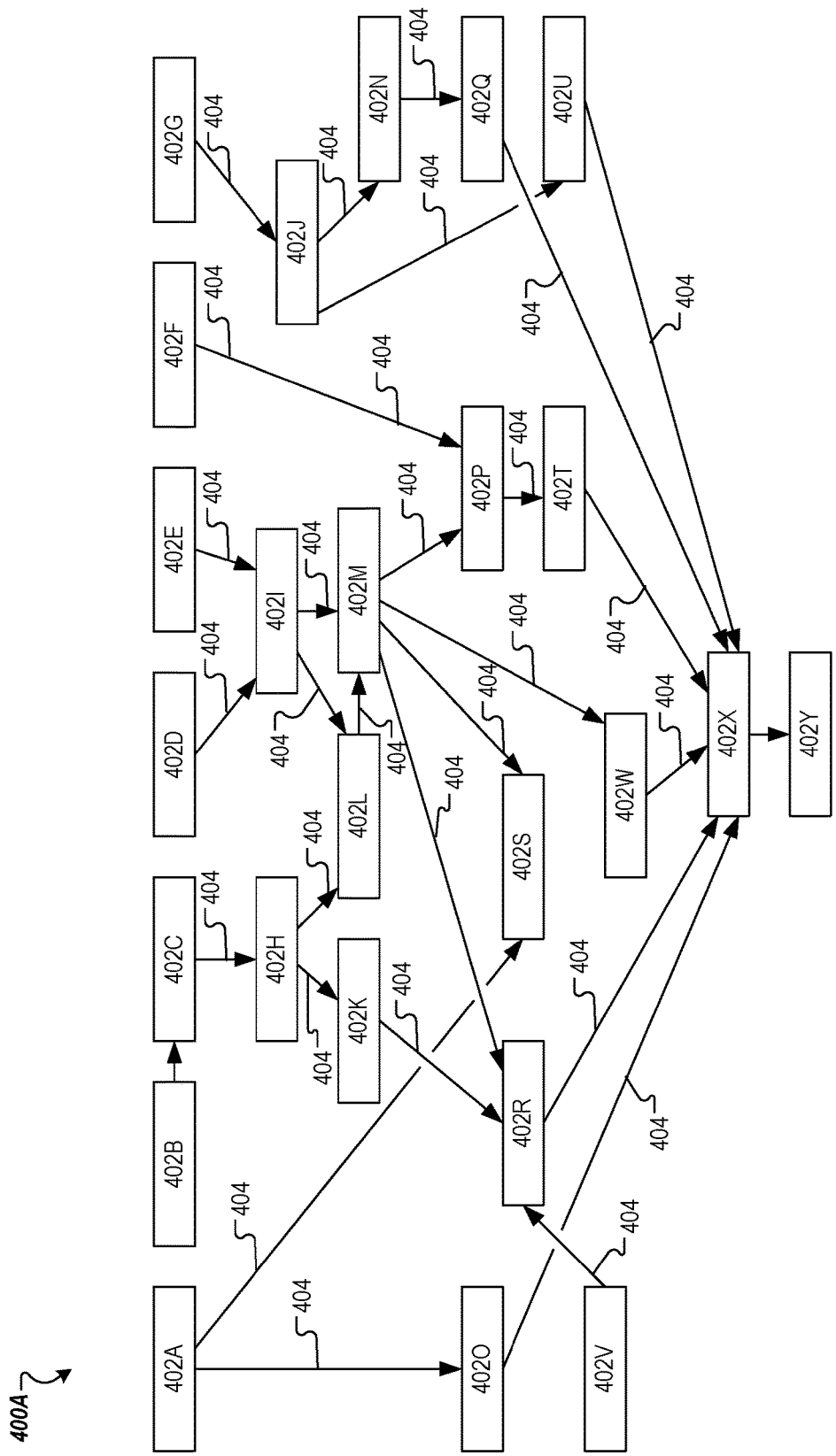
FIG. 4A illustrates a dependency graph associated with a substrate processing system, according to certain embodiments.

FIG. 4A illustrates a dependency graph 400A associated with a substrate processing system (e.g., processing system 102 of FIG. 1B, manufacturing equipment 124 of FIG. 1A), according to certain embodiments. In some embodiments, dependency graph 400A is a directed acyclic graph (DAG).

The dependency graph 400A includes tasks 402 (e.g., blocks, operations, etc.) and dependencies 404 (e.g., arrows). Some of the tasks 402 are linked to one or more other tasks 402 via dependencies 404 (e.g., a task 402 at a tail of a dependency 404 is to be performed before a task 402 at the arrow head of the dependency 404 is to be performed). Some of the tasks 402 are not related to each other via dependencies 404 (e.g., either task 402 could be performed without the other task 402 being performed).

In some embodiments, one or more of the tasks 402 are associated with assembly, installation, testing (e.g., leakage test, radio frequency (RF) load calculations, gas panel calculations, RF calculations, etc.), and/or inspection (e.g., safety inspection) of customer facilities, a load lock, a robot (e.g., main frame robot, factory interface robot, transfer chamber robot), one or more processing chambers, the chuck (e.g., electrostatic chuck) in the one or more processing chambers (e.g., chucking calculations), one or more heat exchangers associated with the one or more processing chambers (e.g., thermal verification), computer (e.g., controller, a computer to control at least the one or more processing chambers), gas panel, a gas panel heater, flow ratio controller (FRC) associated with the gas panel, mainframe (e.g., factory interface, transfer chamber), a factory interface, one or more components of the mainframe connected to a network, process kit rings (e.g., in the one or more processing chambers), a valve manifold box (VMB) (e.g., of one or more fluids, such as one or more gases), and/or the like of the substrate processing system (e.g., processing system 102 of FIG. 1B, manufacturing equipment 124 of FIG. 1A).

In some embodiments, one or more of the tasks 402 are associated with substrate handoff (e.g., by the robot in associated with the factory interface, by a robot in the transfer chamber, etc.).

In some embodiments, one or more of the tasks 402 are associated with performing a set of operations with or without a substrate (e.g., opening a FOUP, moving the factory interface robot from the FOUP to a load lock, opening and closing the loadlock, changing the environment of the load lock to match the transfer chamber, moving a transfer chamber robot from the load lock to a processing chamber, opening and closing the processing chamber, performing one or more operations in the processing chamber, opening and closing the processing chamber, moving the transfer chamber robot from the processing chamber to the load lock, opening and closing the load lock, changing the environment of the load lock to match the factory interface, opening and closing the load lock, moving the factory interface robot from the load lock to the FOUP, etc.). In some embodiments, these one or more tasks 402 are referred to as hardware fingerprint (HWFP) without a substrate and HWFP with a substrate. In some embodiments, one or more tasks 402 associated with performing a set of operations without a substrate (HWFP without a substrate) are performed and then one or more tasks associated with performing the same or a similar set of operations with a substrate (HWFP with a substrate) are performed.

Conventionally, tasks are ordered, are completed one by one in the correct order, and performance of all remaining tasks are stalled responsive to failure of one of the tasks. The present disclosure receives tasks 402, determines dependencies 404, and generates a dependency graph 400A. A schedule is based on outputs of topologically sorting the dependency graph. Responsive to a task 402 being unavailable (e.g., interrupted, delayed, failed, etc.), a corrective action occurs, such as generating an updated schedule (e.g., based on the task 402 being unavailable and the dependencies 404) or determining a subsequent task 402 to perform which does not depend on the task 402 that is unavailable.

In some embodiments, dependency graph 400A includes one or more of tasks 402A-Y. In some embodiments, one or more of tasks 402A-Y in FIG. 4A include one or more tasks described herein. In some embodiments, the dependencies 404 include one or more of the dependencies 404 shown in dependency graph 400A.

In some examples, task 402B is associated with assembly, installation, testing, and/or inspection of a load lock of the substrate processing system and task 402V is associated with assembly, installation, testing, and/or inspection of a factory interface of the substrate processing system. A schedule includes both task 402B and task 402V. Responsive to task 402B being unavailable, instead of waiting until 402B is available to continue other tasks 402, a task 402 that does not have a dependency 404 on task 402B (e.g., task 402V) is performed. Responsive to task 402V being unavailable, instead of waiting until 402V is available to continue other tasks 402, a task 402 that does not have a dependency 404 on task 402V (e.g., task 402B) is performed.

In some examples, task 402I is associated with assembly, installation, testing, and/or inspection of a process kit ring in a processing chamber. Responsive to task 402I being unavailable, tasks 402 that have dependencies 404 on task 402I (e.g., 402P, 402R-T, and 402W-Y) are not performed and instead one or more other tasks 402 that do not have a dependency 404 on task 402I (e.g., 402A, 402F-G, 402J, 402N-O, 402Q, 402U-V) are performed.

Figure 4B:
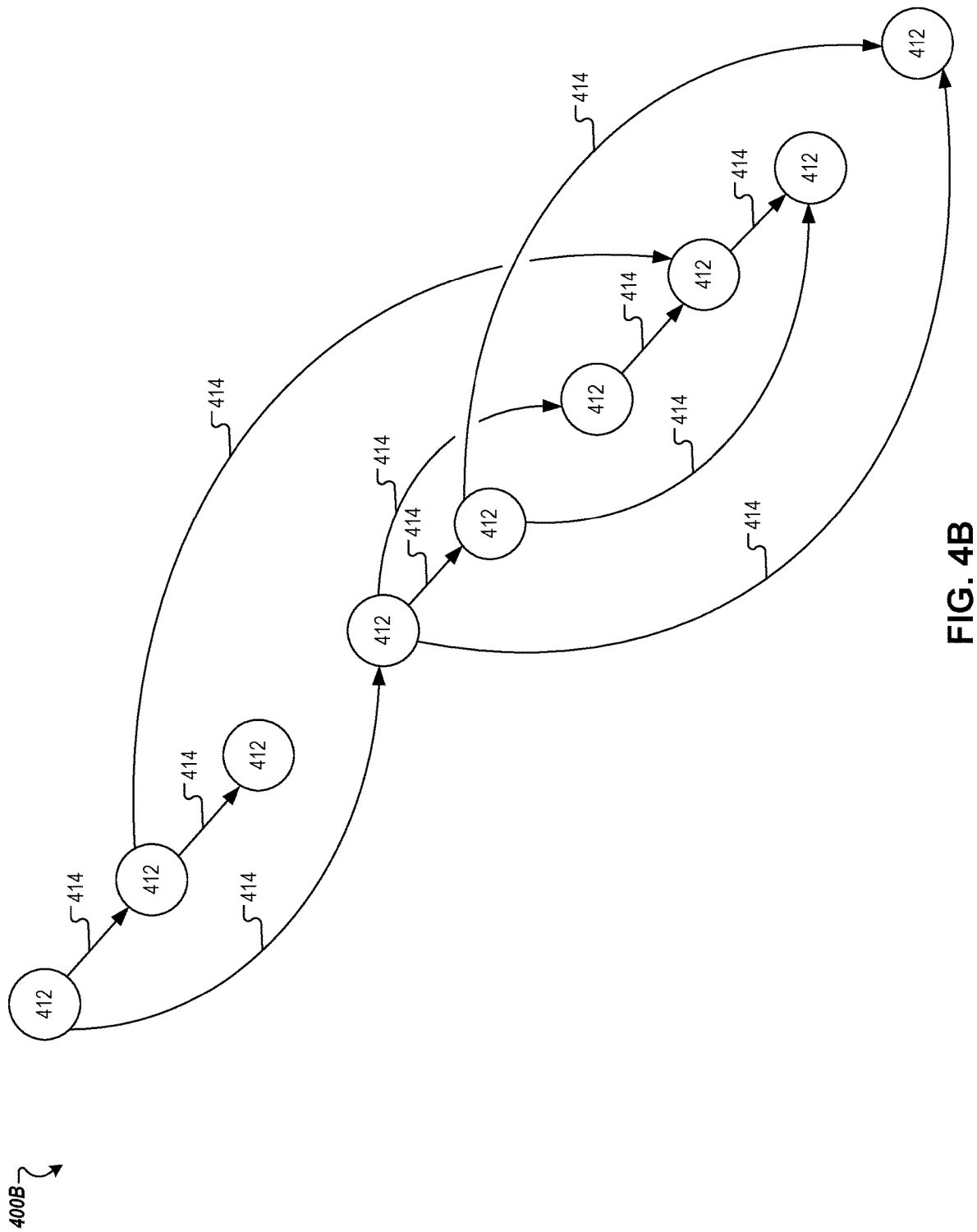
FIG. 4B illustrates a directed acyclic graph (DAG) associated with a substrate processing system, according to certain embodiments.

FIG. 4B illustrates a directed acyclic graph (DAG) 400B associated with a substrate processing system, according to certain embodiments. In some embodiments, DAG 400B is a dependency graph (e.g., dependency graph 400A of FIG. 4A). The DAG 400B has tasks 412 (e.g., task 402 of FIG. 4A) and dependencies 414 (e.g., dependencies 404 of FIG. 4A). In some embodiments, the one or more of the tasks 412 of DAG 400B have multi-point dependencies 414, starting with a known starting task 412 and ending with a known ending task 412.

In some embodiments, the DAG 400B can be topologically sorted. In some embodiments, all tasks 412 of the DAG 400B are to be completed with time complexity of a critical path (e.g., shortest path from start to end).

In some embodiments, the DAG 400B is created with tasks 412, where each node is a task 412 and each arrow is a direct dependency.

In some embodiments, one or more graph algorithms are used to topologically sort the tasks 412 in the DAG 400B to generate one or more outputs.

The topological sort (e.g., topological ordering) of the DAG 400B is a linear ordering of the vertices (e.g., tasks 412) of the DAG 400B so that for every directed edge uv (e.g., dependency 414) from vertex u to vertex v, u comes before v in the ordering. The topological sort output (e.g., topological ordering) is a valid sequence for the tasks. In some embodiments, the topological sort is possible responsive to the DAG 400B not having any directed cycles. In some embodiments, a DAG 400B has one or more topological orderings. In some embodiments, one or more of Kahn's algorithm, depth-first search algorithm, parallel algorithm, and/or the like are used.

In some embodiments, Kahn's algorithm is used to choose vertices in the same order as the eventual topological sort by finding a list of start nodes which have no incoming edges and insert the start nodes into a set, where at least one of the start nodes exists in a non-empty acyclic graph. In some embodiments, a depth-first search algorithm is used to loop through each node of the graph in an arbitrary order, initiating a depth-first search that terminates when hitting any node that has already been visited since the beginning of the topological sort or the node has no outgoing edges. In some embodiments, a parallel algorithm is used to construct a topological ordering using a polynomial number of processors, putting the problem into a complexity class, such as by repeatedly squaring the adjacency matrix of the given graph, logarithmically many times using min-plus matrix multiplication with maximization instead of minimization, where the resulting matrix describes the longest path distances in the graph and by sorting the vertices by the lengths of their longest incoming paths produces a topological ordering.

In some embodiments, after using a graph algorithm (e.g., Kahn's algorithm, depth-first search algorithm, parallel algorithm, and/or the like) to topologically sort the tasks 412 to generate one or more outputs, the one or more outputs are then processed by one or more of a greedy algorithm, a Coffman-Graham algorithm, first come first served (FCFS) algorithm, and/or the like.

In some embodiments, a greedy algorithm (e.g., greedy approach) follows a problem-solving heuristic of making a locally optimal choice at each stage (e.g., providing locally optimal solutions that approximate a globally optimal solution in a reasonable amount of time). In some embodiments, a Coffman-Graham algorithm (e.g., Coffman-Graham approach) arranges elements (e.g., tasks 402 of FIG. 4A, tasks 412 of FIG. 4B) of a partially ordered set into a sequence of levels, where an element that comes after another element in the order is assigned to a lower level so that each level has a number of elements that does not exceed a fixed width bound. In some embodiments, a FCFS algorithm (e.g., FCFS approach, first in first out (FIFO) algorithm) queues processes (e.g., tasks 402 of FIG. 4A, tasks 412 of FIG. 4B) in the order that they arrive in the ready queue.

FIGS. 5A-D are flow diagrams of methods 500A-D associated with scheduling tasks based on dependencies, according to certain embodiments. In some embodiments, methods 500A-D are performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, methods 500A-D are performed, at least in part, by predictive system 130. In some embodiments, method 500A is performed, at least in part, by one or more of predictive system 130 (e.g., predictive server 132, predictive component 134) and/or client device 120 (e.g., corrective action component). In some embodiments, method 500B is performed, at least in part, by predictive system 130 (e.g., server machine 170 and data set generator 172 of FIG. 1A, data set generator 272 of FIG. 2). In some embodiments, predictive system 130 uses method 500B to generate a data set to at least one of train, validate, or test a machine learning model. In some embodiments, method 500C is performed by server machine 180 (e.g., training engine 182, etc.). In some embodiments, method 500D is performed by predictive server 132 (e.g., predictive component 134). In some embodiments, a non-transitory storage medium stores instructions that when executed by a processing device (e.g., of predictive system 130, of server machine 180, of predictive server 132, of client device 120, etc.), cause the processing device to perform one or more of methods 500A-D.

For simplicity of explanation, methods 500A-D are depicted and described as a series of operations. However, operations in accordance with this disclosure can occur in various orders and/or concurrently and with other operations not presented and described herein. Furthermore, in some embodiments, not all illustrated operations are performed to implement methods 500A-D in accordance with the disclosed subject matter. In addition, those skilled in the art will understand and appreciate that methods 500A-D could alternatively be represented as a series of interrelated states via a state diagram or events.

Figure 5A:
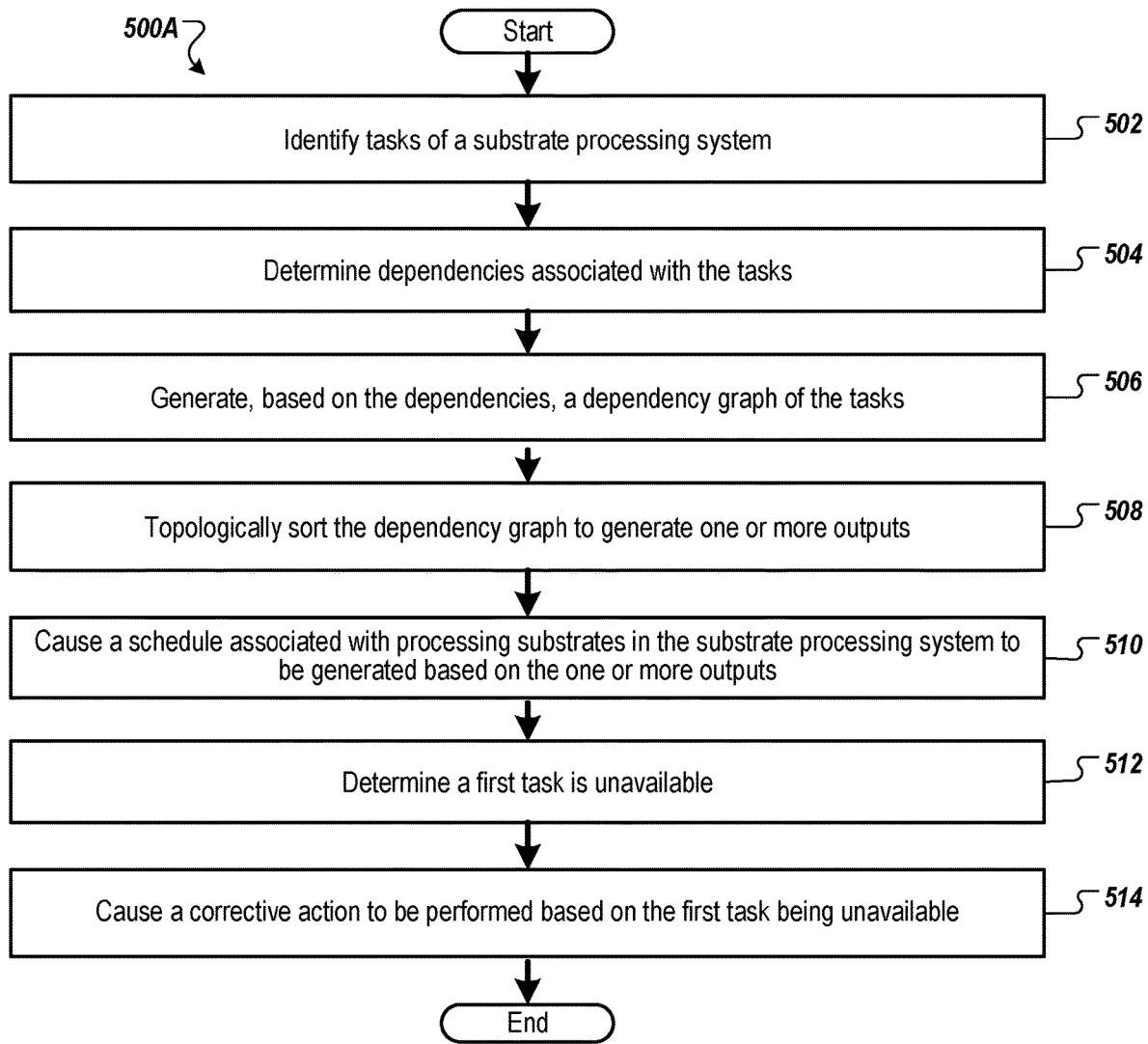
FIGS. 5A-D are flow diagrams of methods associated with scheduling tasks based on dependencies, according to certain embodiments.

FIG. 5A is a flow diagram of a method 500A for scheduling tasks based on dependencies, according to certain embodiments.

Referring to FIG. 5A, in some embodiments, at block 502, the processing logic identifies tasks of a substrate processing system. In some embodiments, the tasks are associated with one or more of assembly, testing, inspection, transfer, processing, and/or the like. In some embodiments, the processing logic identifies the tasks based on information regarding the substrate processing system (e.g., a digital model, a list of components, a description of components, a number of each components, such as a number of processing chambers, and/or the like).

In some embodiments, the tasks are referred to tier 1 tasks. In some embodiments, tier 1 tasks are one or more of assembly, setup, testing, inspection, transfer, and/or processing tasks. In some embodiments, tier 1 tasks include setting up the manufacturing equipment (e.g., a task failure in tier 1 tasks results from equipment not meeting a test and/or a substrate falling apart). In some embodiments, tier 1 tasks include tasks up until the processing of substrates to receiving metrology data of the substrates to determine if the substrates meet specification. In some embodiments, tier 2 tasks include processing substrates, receiving metrology data of the substrates, and determining, based on the metrology data, if the substrates meet specification.

At block 504, the processing logic determines dependencies associated with the tasks. In some embodiments, the dependencies are determined via user input (e.g., user input indicating which tasks depend from which tasks). In some embodiments, the dependencies are determined via one or more dependency libraries (e.g., for each component and/or task, a corresponding set of dependencies is determined via the one or more dependency libraries). In some embodiments, the processing logic determines dependencies via a trained machine learning model (e.g., see FIGS. 5B-D).

At block 506, the processing logic generates, based on the dependencies, a dependency graph (e.g., dependency graph 400A of FIG. 4A, DAG 400B of FIG. 4B, etc.) of the tasks. In some embodiments, the dependency graph is a graphical representation of nodes (e.g., tasks) joined by arrows (e.g., dependencies).

At block 508, the processing logic topologically sorts the dependency graph to generate one or more outputs (e.g., to generate a topological sort, to generate a topological ordering). In some embodiments, the processing logic uses one or more graph algorithms (e.g., Kahn's algorithm, depth-first search algorithm, parallel algorithm, and/or the like) to topologically sort the dependency graph. In some embodiments, the one or more outputs include a linear ordering (e.g., topological sort, topological ordering, valid sequence) of the tasks of the dependency graph At block 510, the processing logic causes a schedule associated with processing substrates in the substrate processing system to be generated based on the one or more outputs. In some embodiments, the schedule is associated with assembly, inspection, testing, and/or the like of a substrate processing system (e.g., processing system 102 of FIG. 1B, manufacturing equipment 124 of FIG. 1A). In some examples, the schedule indicates an order of tasks, such as assembly of a component, testing of the component, movement of a component, transfer of a substrate to or via the component, and/or the like. In some embodiments, the schedule indicates if a particular task is unavailable, a different order of tasks that are not dependent on the particular task. In some embodiments, the schedule includes an order of the tasks that takes the least amount of resources (e.g., one or more of time, materials, energy, and/or the like).

In some embodiments, the processing logic causes the schedule to be generated by processing the one or more outputs by one or more of a greedy algorithm, a Coffman-Graham algorithm, FCFS algorithm, and/or the like. In some embodiments, the schedule includes an order for performing the tasks. In some embodiments, blocks 508-510 are combined so that one or more of the algorithms described in blocks 508-510 are used to topologically sort the dependency graph to generate the schedule. In some embodiments, the tasks are performed (e.g., by manufacturing equipment) based on the schedule (e.g., order of performing the tasks in one or more parallel orders and/or sequential orders).

At block 512, the processing logic determines a first task is unavailable. In some embodiments, the processing logic determines the first task is unavailable based on an indication from sensors and/or metrology equipment associated with the manufacturing equipment (e.g., that is performing the tasks), the manufacturing equipment, testing equipment, and/or the like. In some embodiments, the processing logic determines the first task is unavailable based on user input. In some embodiments, the processing logic determines the first task is unavailable responsive to the first task being delayed, having failed (e.g., not passing a test), being interrupted, not having one or more corresponding components or materials, and/or the like.

At block 514, the processing logic causes a corrective action to be performed based on the first task being unavailable. In some embodiments, the corrective action comprises one or more of providing an alert, interrupting operation of one or more portions of the manufacturing equipment, adjusting manufacturing parameters, and/or the like. In some embodiments, the corrective action includes determining a subsequent task to be performed based on the first task that is unavailable. In some embodiments, the schedule indicates which tasks depend on the first task that is unavailable and/or indicate which tasks do not depend on the first task that is unavailable. In some embodiments, the schedule is used to determine an updated order of tasks to be performed once the first task is unavailable (e.g., perform all other tasks that do not depend on the first task that is unavailable in an order that is time efficient).

In some embodiments, the corrective action includes generating an updated schedule based on the first task that is unavailable. In some embodiments, the updated schedule is generated by performing one or more of blocks 502-510 to generate the updated schedule based on a subset of the tasks (e.g., the original tasks without any tasks that are unavailable and/or any tasks that have been completed). In some examples, the processing logic identifies a subset of the tasks (e.g., not including the first task that is unavailable) at block 502, determines dependencies of the subset of tasks at block 504, generates an updated dependency graph based on the dependencies and updated tasks at block 506, topologically sorts the updated dependency graph to generate one or more updated outputs at block 508, and causes an updated schedule to be generated based on the one or more updated outputs. In some embodiments, the updated schedule includes an updated order of the remaining tasks (e.g., tasks that are not unavailable and that have not been completed yet) that takes the least amount of resources (e.g., one or more of time, materials, energy, and/or the like).

In some embodiments, a first set of one or more operations includes creating a valid dependency graph G of tasks (e.g., where each node is a task and each arrow is a direct dependency, such as in FIGS. 4A-B) and a second set of one or more operations includes using one or more graph algorithms to topologically sort the tasks followed by using one or more algorithms (e.g., greedy, Coffman-Graham, FCFS) for scheduling G. In the case of failures (e.g., one or more tasks in G is unavailable, delayed, failed, etc.), at least a portion of the second set of one or more operations is applied for the remaining subgraph of G (e.g., the graph algorithm, greedy algorithm, Coffman-Graham algorithm, and/or FCFS algorithm are applied to the tasks that are not unavailable and/or have not be performed).

In some embodiments, one or more of methods 500A-D are used for troubleshooting and/or knowledge capture. In some embodiments, one or more of methods 500A-D are used for on-premises, on-tool analytics and/or user interface (UI) to show results of tasks fingerprint data (e.g., task results, such as test and/or inspection results).

In some embodiments, one or more of methods 500A-D are used for dynamic scheduling based on startup task dependencies. In some embodiments, one or more of methods 500A-D are used to generate an optimized sequence of tool-startup tasks that minimize startup delays and delivers the tool (e.g., substrate processing equipment, manufacturing equipment) faster at customer sites. In some embodiments, one or more of methods 500A-D are robust to failure and external delays such as fab-constraints, facilities, vendor delays, and/or the like. In some embodiments, one or more of methods 500A-D are used to predict, at any given point in time, remaining time to finish, suggests best-possible next tasks to be performed that do not have dependencies, and/or the like. In some embodiments, one or more of methods 500A-D are used to reduce delays (e.g., idle delays, waiting for parts, facilities delay, labor delay, etc.) in tool startup which improves research and development.

Figure 5B:
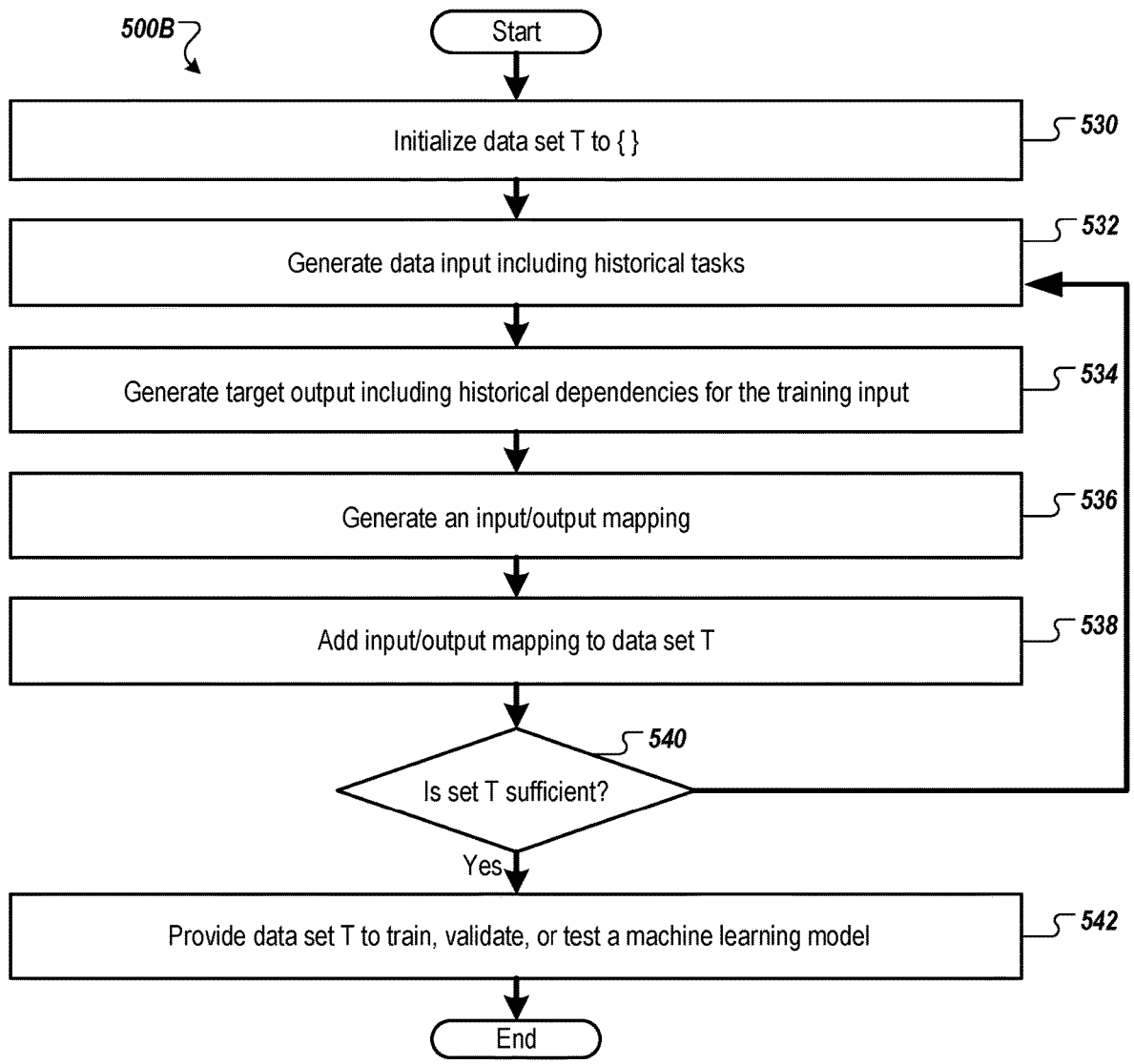

FIG. 5B is a flow diagram of a method 500B for generating a data set for a machine learning model for generating predictive data (e.g., predictive data 160 of FIG. 1A), according to certain embodiments.

Referring to FIG. 5B, in some embodiments, at block 530 the processing logic implementing method 500B initializes a training set T to an empty set.

At block 532, processing logic generates first data input (e.g., first training input, first validating input) that includes tasks (e.g., historical tasks 144 of FIG. 1A, historical tasks 244 of FIG. 2). In some embodiments, the first data input includes a first set of features for types of tasks and a second data input includes a second set of features for types of tasks (e.g., as described with respect to FIG. 2).

At block 534, processing logic generates a first target output for one or more of the data inputs (e.g., first data input). In some embodiments, the first target output is historical dependencies (e.g., historical dependencies 152 of FIG. 1A, historical dependencies 252 of FIG. 2).

At block 536, processing logic optionally generates mapping data that is indicative of an input/output mapping. The input/output mapping (or mapping data) refers to the data input (e.g., one or more of the data inputs described herein), the target output for the data input (e.g., where the target output identifies historical dependencies 152), and an association between the data input(s) and the target output.

At block 538, processing logic adds the mapping data generated at block 536 to data set T.

At block 540, processing logic branches based on whether data set T is sufficient for at least one of training, validating, and/or testing machine learning model 190. If so, execution proceeds to block 542, otherwise, execution continues back at block 532. It should be noted that in some embodiments, the sufficiency of data set T is determined based simply on the number of input/output mappings in the data set, while in some other implementations, the sufficiency of data set T is determined based on one or more other criteria (e.g., a measure of diversity of the data examples, accuracy, etc.) in addition to, or instead of, the number of input/output mappings.

At block 542, processing logic provides data set T (e.g., to server machine 180) to train, validate, and/or test machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In the case of a neural network, for example, input values of a given input/output mapping (e.g., numerical values associated with data inputs 210) are input to the neural network, and output values (e.g., numerical values associated with target outputs 220) of the input/ output mapping are stored in the output nodes of the neural network. The connection weights in the neural network are then adjusted in accordance with a learning algorithm (e.g., back propagation, etc.), and the procedure is repeated for the other input/output mappings in data set T. After block 542, machine learning model (e.g., machine learning model 190) can be at least one of trained using training engine 182 of server machine 180, validated using validating engine 184 of server machine 180, or tested using testing engine 186 of server machine 180. The trained machine learning model is implemented by predictive component 134 (of predictive server 132) to generate predictive data 160 to schedule tasks based on dependencies.

Figure 5C:
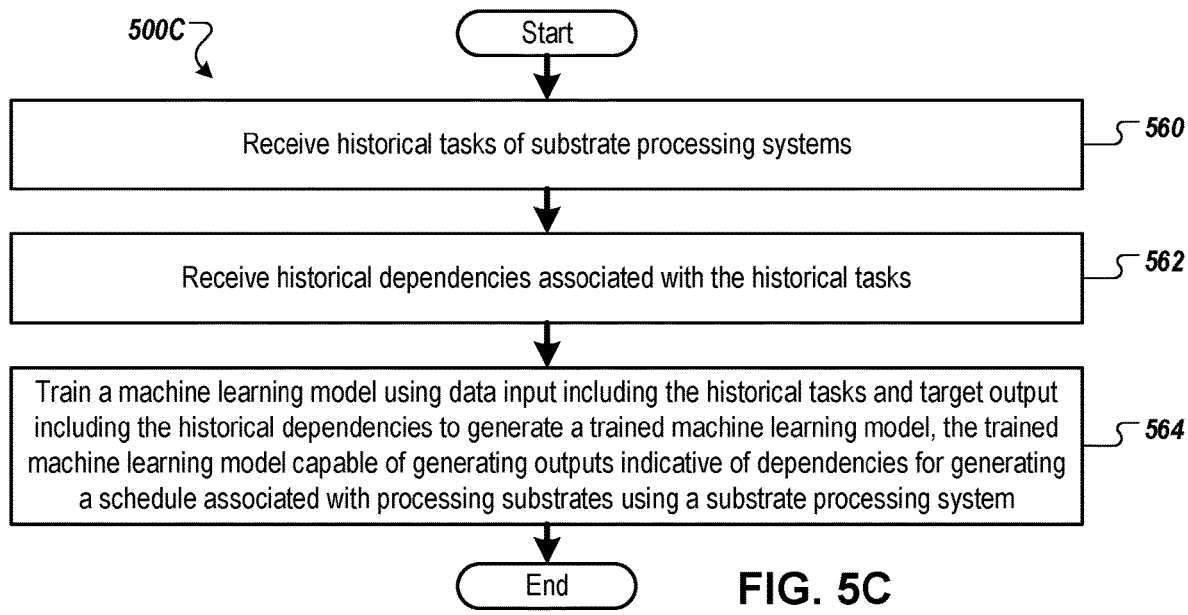

FIG. 5C is a method for training a machine learning model (e.g., model 190 of FIG. 1A) for determining predictive data (e.g., predictive data 160 of FIG. 1A) to generate a schedule of tasks based on dependencies, according to certain embodiments.

Referring to FIG. 5C, at block 560 of method 500C, the processing logic receives sets of historical tasks (e.g., historical tasks 144 of FIG. 1A) associated with historical bonded metal plate structures of one or more substrate processing systems.

At block 562, the processing logic receives sets of historical dependencies (e.g., historical dependencies 152 of FIG. 1A) associated with the historical bonded metal plate structures. Each of the sets of the historical dependencies corresponds to a respective set of historical tasks. In some embodiments, the historical dependencies are indicative of which historical tasks depend from which historical tasks.

At block 564, the processing logic trains a machine learning model using data input including the sets of historical tasks and target output including the historical dependencies to generate a trained machine learning model. The trained machine learning model is capable of generating outputs indicative of predictive data (e.g., predictive data 160) to schedule tasks based on dependencies.

Figure 5D:
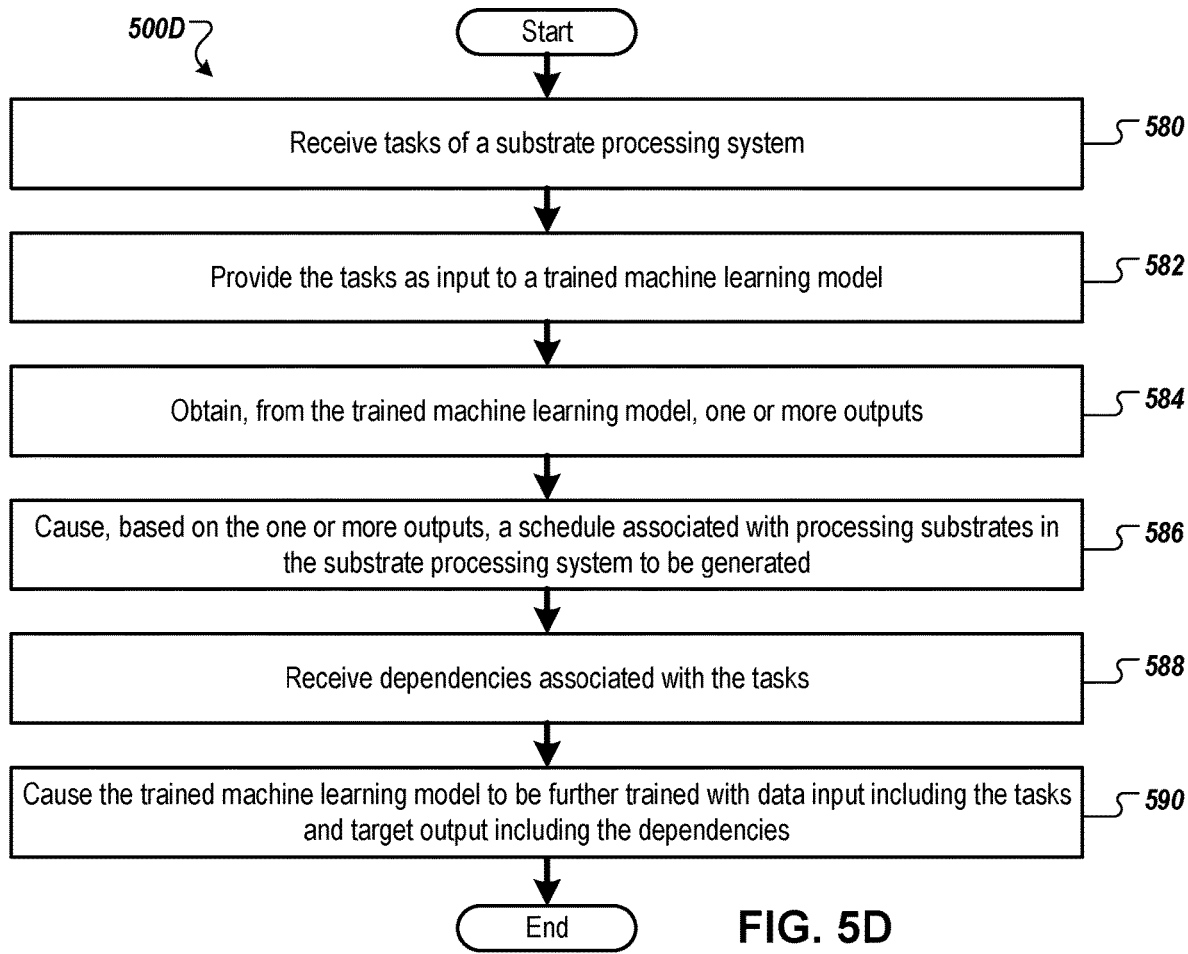

FIG. 5D is a method 500D for using a trained machine learning model (e.g., model 190 of FIG. 1A) to generate a schedule of tasks based on dependencies, according to certain embodiments.

Referring to FIG. 5D, at block 580 of method 500D, the processing logic receives sets of tasks (e.g., current tasks 146 of FIG. 1A) associated with a substrate processing system (e.g., tasks associated with assembly, testing, inspection, transfer, processing, and/or the like). In some embodiments, block 580 is similar to block 502 of FIG. 5A.

At block 582, the processing logic provides the sets of tasks as input to a trained machine learning model (e.g., the trained machine learning model of block 564 of FIG. 5C).

At block 584, the processing logic obtains, from the trained machine learning model, one or more outputs (e.g., indicative of predictive data 160 of FIG. 1A). In some embodiments, the outputs (e.g., predictive data) are indicative of dependencies of the tasks.

At block 586, the processing logic causes, based on the one or more outputs (e.g., predictive data, dependencies indicated by the one or more outputs), a schedule associated with processing substrates in the substrates in the substrate processing system to be generated. In some embodiments, block 586 is similar to block 510 of FIG. 5A.

At block 588, processing logic receives (e.g., via user input, etc.) dependencies (e.g., current dependencies 154 of FIG. 1A) associated with the tasks At block 590, processing logic causes the trained machine learning model to be further trained (e.g., re-trained) with data input including the sets of tasks (e.g., from block 580) and target output including the dependencies (e.g., from block 588).

In some embodiments, one or more of blocks 580-590 are repeated until the one or more outputs (e.g., predictive data, dependencies) are indicative of the dependencies of the tasks received in block 580.

Figure 6:
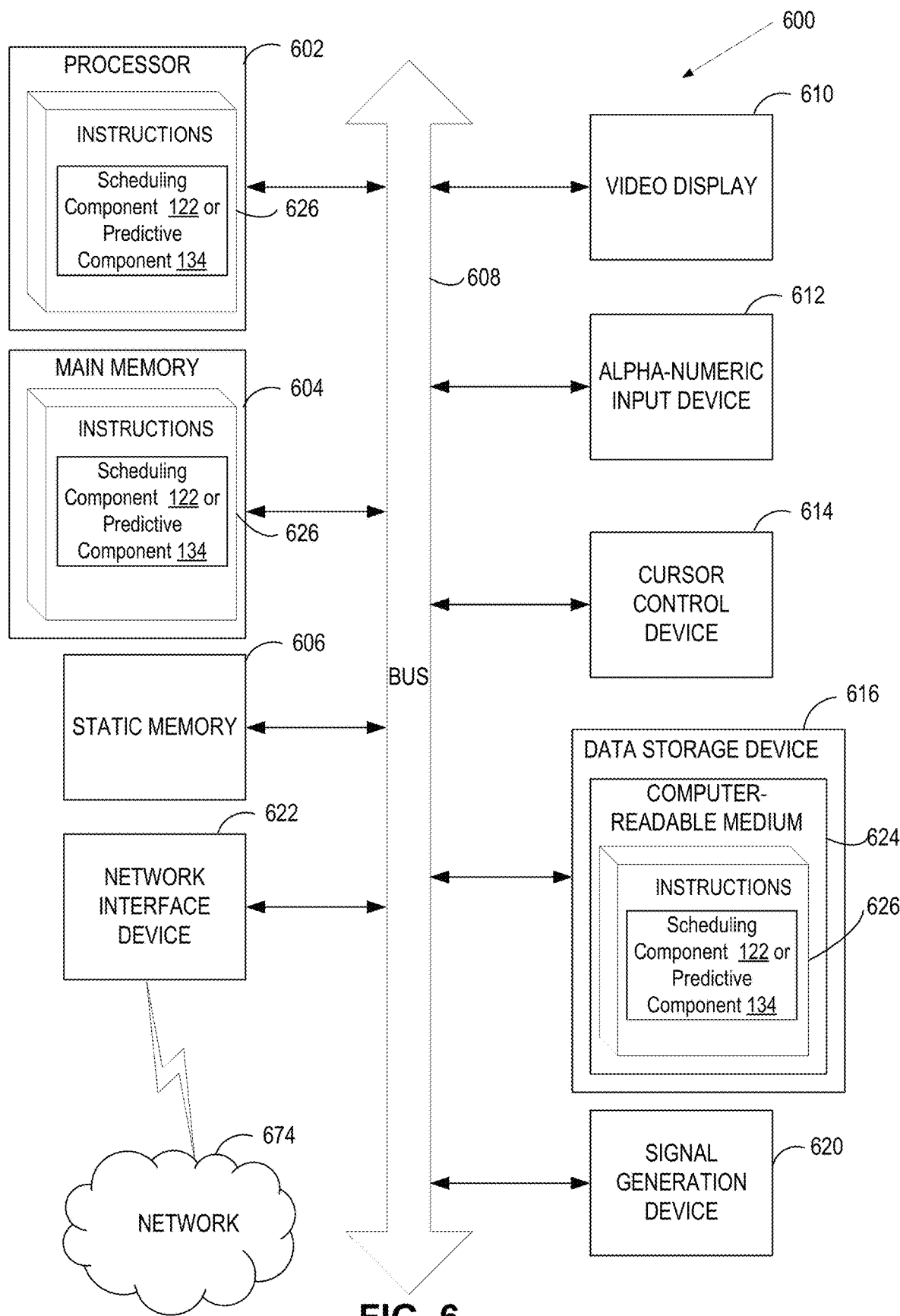
FIG. 6 is a block diagram illustrating a computer system, according to certain embodiments.

FIG. 6 is a block diagram illustrating a computer system 600, according to certain embodiments. In some embodiments, the computer system 600 is one or more of client device 120, predictive system 130, server machine 170, server machine 180, or predictive server 132.

In some embodiments, computer system 600 is connected (e.g., via a network, such as a Local Area Network (LAN), an intranet, an extranet, or the Internet) to other computer systems. In some embodiments, computer system 600 operates in the capacity of a server or a client computer in a client-server environment, or as a peer computer in a peer-to-peer or distributed network environment. In some embodiments, computer system 600 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein (e.g., one or more of methods 500A-D of FIGS. 5A-D).

In a further aspect, the computer system 600 includes a processing device 602, a volatile memory 604 (e.g., Random Access Memory (RAM)), a non-volatile memory 606 (e.g., Read-Only Memory (ROM) or Electrically-Erasable Programmable ROM (EEPROM)), and a data storage device 616, which communicate with each other via a bus 608.

In some embodiments, processing device 602 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

In some embodiments, computer system 600 further includes a network interface device 622 (e.g., coupled to network 674). In some embodiments, computer system 600 also includes a video display unit 610 (e.g., an LCD), an alphanumeric input device 612 (e.g., a keyboard), a cursor control device 614 (e.g., a mouse), and a signal generation device 620.

In some implementations, data storage device 616 includes a non-transitory computer-readable storage medium 624 on which store instructions 626 encoding any one or more of the methods or functions described herein, including instructions encoding components of FIG. 1A (e.g., scheduling component 122, predictive component 134, etc.) and for implementing methods described herein (e.g., one or more of methods 500A-D).

In some embodiments, instructions 626 also reside, completely or partially, within volatile memory 604 and/or within processing device 602 during execution thereof by computer system 600, hence, in some embodiments, volatile memory 604 and processing device 602 also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In some embodiments, the methods, components, and features described herein are implemented by discrete hardware components or are integrated in the functionality of other hardware components such as ASICS, FPGAs, DSPs or similar devices. In some embodiments, the methods, components, and features are implemented by firmware modules or functional circuitry within hardware devices. In some embodiments, the methods, components, and features are implemented in any combination of hardware devices and computer program components, or in computer programs.

Unless specifically stated otherwise, terms such as "determining," "generating," "sorting," "performing," "causing," "training," "providing," "obtaining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In some embodiments, the terms "first," "second," "third," "fourth," etc. as used herein are meant as labels to distinguish among different elements and do not have an ordinal meaning according to their numerical designation.

Examples described herein also relate to an apparatus for performing the methods described herein. In some embodiments, this apparatus is specially constructed for performing the methods described herein, or includes a general purpose computer system selectively programmed by a computer program stored in the computer system. Such a computer program is stored in a computer-readable tangible storage medium.

The methods and illustrative examples described herein are not inherently related to any particular computer or other apparatus. In some embodiments, various general purpose systems are used in accordance with the teachings described herein. In some embodiments, a more specialized apparatus is constructed to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   determining a plurality of dependencies associated with a plurality of tasks of a substrate processing system;
   generating, based on the plurality of dependencies, a dependency graph of the plurality of tasks;
   topologically sorting the dependency graph to generate one or more outputs that are each associated with a corresponding topological ordering of the plurality of tasks, wherein a schedule associated with processing a plurality of substrates in the substrate processing system is based on at least one of the one or more outputs;
   responsive to determining that a first task of the plurality of tasks is unavailable, determining an updated topological ordering of remaining tasks of a remaining subgraph of the dependency graph; and causing performance of the updated topological ordering of remaining tasks via the substrate processing system to produce one or more substrates.

2. The method of claim 1, wherein the schedule comprises tool startup times of a plurality of tools in the substrate processing system.

3. The method of claim 1 further comprising:
determining a second task of the plurality of tasks is unavailable; and
performing a corrective action based on the second task being unavailable.

4. The method of claim 3, wherein the performing of the corrective action comprises generating an updated schedule based on the second task being unavailable in view of one or more of the plurality of dependencies.

5. The method of claim 3, wherein the performing of the corrective action comprises determining a subsequent task of the plurality of tasks to perform, the subsequent task not depending on the second task.

6. The method of claim 1, wherein the plurality of tasks comprise one or more of:
assembly tasks to assemble one or more portions of the substrate processing system;
transfer tasks to transfer the plurality of substrates in the substrate processing system; or
processing tasks to process the plurality of substrates in the substrate processing system.

7. The method of claim 1, wherein the dependency graph is a directed acyclic graph.

8. The method of claim 1 further comprising:
receiving historical tasks associated with one or more substrate processing systems;
receiving historical dependencies associated with the plurality of tasks; and
training a machine learning model with data input comprising the historical tasks and target output comprising the historical dependencies to generate a trained machine learning model, the trained machine learning model being capable of generating one or more corresponding outputs indicative of the plurality of dependencies.

9. The method of claim 1, wherein the determining of the plurality of dependencies comprises:
providing the plurality of tasks as input to a trained machine learning model; and
obtaining, from the trained machine learning model, one or more corresponding outputs indicative of the plurality of dependencies.

10. A non-transitory machine-readable storage medium storing instructions which, when executed cause a processing device to perform operations comprising:
determining a plurality of dependencies associated with a plurality of tasks of a substrate processing system;
generating, based on the plurality of dependencies, a dependency graph of the plurality of tasks;
topologically sorting the dependency graph to generate one or more outputs that are each associated with a corresponding topological ordering of the plurality of tasks, wherein a schedule associated with processing a plurality of substrates in the substrate processing system is based on at least one of the one or more outputs;
responsive to determining that a first task of the plurality of tasks is unavailable, determining an updated topological ordering of remaining tasks of a remaining subgraph of the dependency graph; and
causing performance of the updated topological ordering of remaining tasks via the substrate processing system to produce one or more substrates.

11. The non-transitory machine-readable storage medium of claim 10, wherein the schedule comprises tool startup times of a plurality of tools in the substrate processing system.

12. The non-transitory machine-readable storage medium of claim 10, wherein the operations further comprise:
determining a second task of the plurality of tasks is unavailable; and
performing a corrective action based on the second task being unavailable.

13. The non-transitory machine-readable storage medium of claim 12, wherein the performing of the corrective action comprises generating an updated schedule based on the second task being unavailable in view of one or more of the plurality of dependencies.

14. The non-transitory machine-readable storage medium of claim 12, wherein the performing of the corrective action comprises determining a subsequent task of the plurality of tasks to perform, the subsequent task not depending on the second task.

15. The non-transitory machine-readable storage medium of claim 10, wherein the plurality of tasks comprise one or more of:
assembly tasks to assemble one or more portions of the substrate processing system;
transfer tasks to transfer the plurality of substrates in the substrate processing system; or
processing tasks to process the plurality of substrates in the substrate processing system.

16. A system comprising:
a memory; and
a processing device coupled to the memory, wherein the processing device is to:
determine a plurality of dependencies associated with a plurality of tasks of a substrate processing system;
generate, based on the plurality of dependencies, a dependency graph of the plurality of tasks;
topologically sort the dependency graph to generate one or more outputs that are each associated with a corresponding topological ordering of the plurality of tasks, wherein a schedule associated with processing a plurality of substrates in the substrate processing system is based on at least one of the one or more outputs;
responsive to determining that a first task of the plurality of tasks is unavailable, determine an updated topological ordering of remaining tasks of a remaining subgraph of the dependency graph; and
cause performance of the updated topological ordering of remaining tasks via the substrate processing system to produce one or more substrates.

17. The system of claim 16, wherein the schedule comprises tool startup times of a plurality of tools in the substrate processing system.

18. The system of claim 16, wherein the processing device is further to:
determine a second task of the plurality of tasks is unavailable; and
perform a corrective action based on the second task being unavailable.

19. The system of claim 18, wherein to perform the corrective action, the processing device is to one or more of:

generate an updated schedule based on the first task being unavailable in view of one or more of the plurality of dependencies; or determine a subsequent task of the plurality of tasks to perform, the subsequent task not depending on the second task.

20. The system of claim 16, wherein the plurality of tasks comprise one or more of:

assembly tasks to assemble one or more portions of the substrate processing system;

transfer tasks to transfer the plurality of substrates in the substrate processing system; or processing tasks to process the plurality of substrates in the substrate processing system.

\* \* \* \* \*